United States Patent
Birk et al.

(12) 
(10) Patent No.: US 6,502,139 B1
(45) Date of Patent: Dec. 31, 2002

(54) SYSTEM FOR OPTIMIZING VIDEO ON DEMAND TRANSMISSION BY PARTITIONING VIDEO PROGRAM INTO MULTIPLE SEGMENTS, DECREASING TRANSMISSION RATE FOR SUCCESSIVE SEGMENTS AND REPEATEDLY, SIMULTANEOUSLY TRANSMISSION

(75) Inventors: Yitzhak Birk, Hod Hasharon; Ron Mondri, Haifa, both of (IL)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

(21) Appl. No.: 09/322,976

(22) Filed: Jun. 1, 1999

(51) Int. Cl.$^7$ .............................. G06F 15/16; H04N 7/10
(52) U.S. Cl. ........................................ 709/233; 725/101
(58) Field of Search ................................ 709/231, 232, 709/233, 229, 230; 380/210; 348/7; 345/329, 330; 711/112, 114; 725/88, 87, 101, 92

(56) References Cited

U.S. PATENT DOCUMENTS

| | | | |
|---|---|---|---|
| 5,421,031 A | | 5/1995 | DeBey |
| 5,532,735 A | * | 7/1996 | Blahut et al. .................. 348/13 |
| 5,604,731 A | * | 2/1997 | Grossglauser et al. ...... 370/223 |
| 5,606,359 A | * | 2/1997 | Youden et al. .................. 348/7 |
| 5,610,653 A | * | 3/1997 | Abecassis .................... 348/10 |
| 5,640,194 A | * | 6/1997 | Suzuki et al. ................... 348/7 |
| 5,694,334 A | * | 12/1997 | Donahue et al. ............. 364/514 |
| 5,701,582 A | * | 12/1997 | DeBey ........................ 455/5.1 |
| 5,751,336 A | | 5/1998 | Aggarwal et al. |
| 5,752,160 A | * | 5/1998 | Dunn .......................... 455/5.1 |
| 5,793,412 A | * | 8/1998 | Asamizuya ..................... 348/7 |
| 5,815,491 A | * | 9/1998 | Guibert ....................... 370/233 |
| 5,845,279 A | * | 12/1998 | Garofalakis et al. ........... 707/7 |
| 5,850,218 A | * | 12/1998 | LaJoie et al. ............... 345/327 |
| 5,884,141 A | * | 3/1999 | Inoue et al. .................. 455/6.2 |
| 5,899,582 A | * | 5/1999 | DuLac ........................ 346/125 |
| 6,018,539 A | * | 1/2000 | Kermode et al. ............... 348/7 |
| 6,115,786 A | * | 9/2000 | Miztani ....................... 711/111 |
| 6,122,662 A | * | 9/2000 | Emura ........................ 709/219 |

OTHER PUBLICATIONS

Aggarwal et al., "A permutation based pyramid broadcasting scheme for video on demand", IEEE, 1996, pp. 118–126.*
Shen et al., "Staircase data broadcasting and receiving scheme for hot video service", IEEE, Jul. 1997, pp. 1110–1117.*
Hua et al., "Skyscraper broadcasting: A new broadcasting scheme for metropolitan video on demand system", ACM, 1997, pp. 89–100.*
Dan et al., "Scheduling policies of on demand video server with batching", ACM, 1994, pp. 15–23.*

* cited by examiner

Primary Examiner—Le Hien Luu
Assistant Examiner—Bunjob Jaroenchonwanit
(74) Attorney, Agent, or Firm—Mark M. Friedman

(57) ABSTRACT

A system and method for Near Video On Demand (NVOD) transmission of a program from a server to a plurality of clients. The program is partitioned into segments. Each segment is transmitted repeatedly, with the transmission rate of segments subsequent to the first segment being lower than the transmission rate of the first segment. The transmission of the segments is scheduled in a manner that minimizes the aggregate transmission bandwidth, subject to constraints related to client parameters such as client storage capacity and client recording rates. Preferably, the sequences are partitioned further into subsequences, and redundant subsequences are used for error correction. Preferably, the segments, or the subsegments, include metadata such as segment or subsegment length, segment or subsegment sequence number, or the time until the next transmission of the sequence or subsequence.

67 Claims, 4 Drawing Sheets

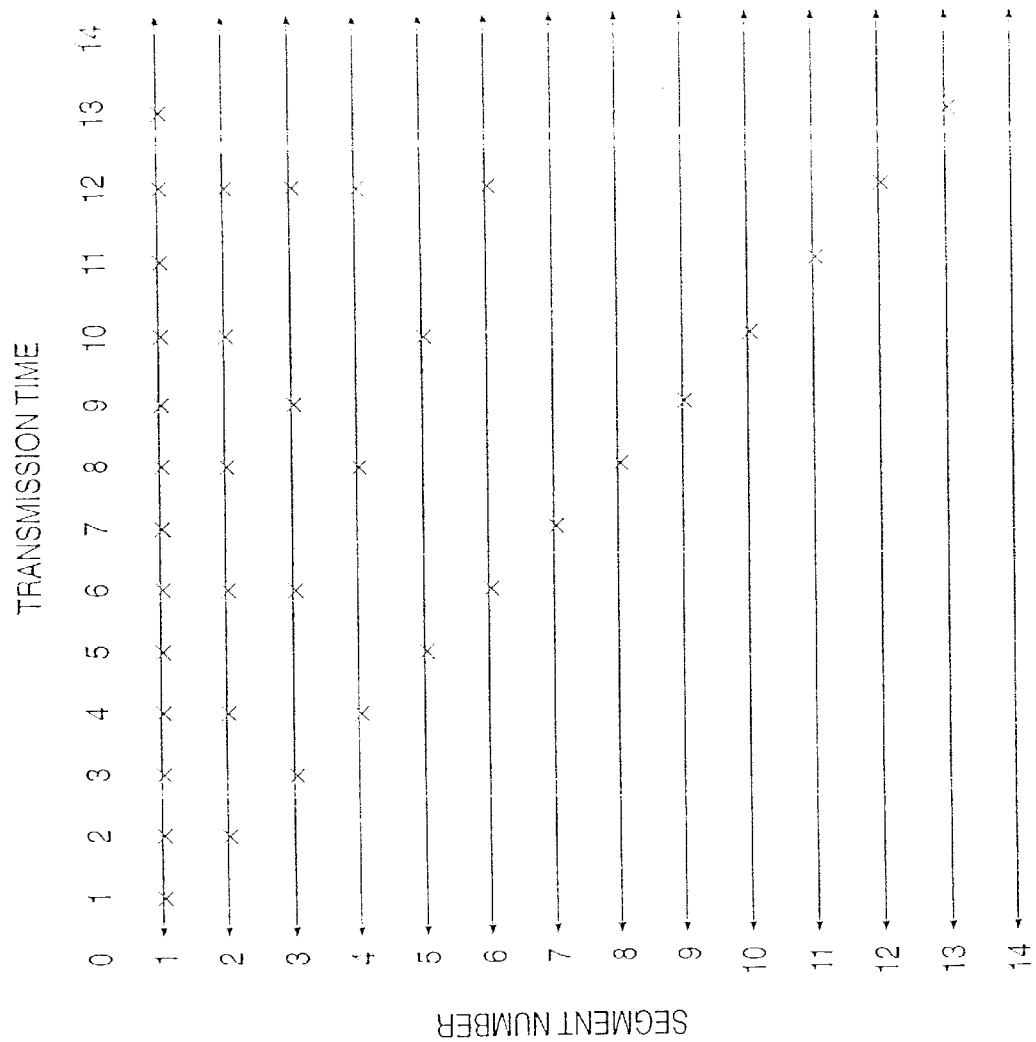

SYSTEM FOR OPTIMIZING VIDEO ON DEMAND TRANSMISSION BY PARTITIONING VIDEO PROGRAM INTO MULTIPLE SEGMENTS, DECREASING TRANSMISSION RATE FOR SUCCESSIVE SEGMENTS AND REPEATEDLY, SIMULTANEOUSLY TRANSMISSION

FIELD AND BACKGROUND OF THE INVENTION

The present invention relates to a method and system for transmitting a program to a plurality of viewers, permitting flexible, nearly on demand viewing by an unlimited number of concurrent viewers, and, more particularly, to a method and system for transmission that minimizes transmission bandwidth, possibly subject to certain constraints.

Video-On-Demand (VOD) is the on-line version of traditional video-rental services. As with video rental services, each viewer receives a dedicated "copy" of the movie and can view it in a flexible manner, including the ability to pause and resume, rewind, and possibly even fast-forward. With VOD, the "rental" operation is essentially instantaneous, and viewing can begin within seconds of the decision to view.

The "copy" in VOD is a dedicated video stream. This stream is generated by a video server and sent to the viewer over a communication network. An important advantage of VOD over tape rental is the great flexibility in allocation of resources: the maximum number of concurrent viewers is independent of viewing choices, and is limited only by the server's total streaming capacity. The required bandwidth resources, both in the server and in the communication network, are proportional to the number of concurrent viewers.

There are important situations in which a large number of people wish to view the same content during the same period of time, albeit not simultaneously. One example is viewing emergency-preparedness instruction in the hours or days prior to the arrival of a major storm. Another example is a newly released "hot" movie that is advertised heavily. Yet another example is a movie whose viewing is assigned as homework, or even a recorded lecture viewed (individually) in class by the students. These pre-recorded instructions, movies and lectures are examples of programs that are to be viewed by many viewers, concurrently but not necessarily simultaneously.

Although VOD could be used to address such situations, it is both highly desirable and intuitively possible to do better. The desire stems from the fact that even the total (over all programs) number of concurrent viewers may be temporarily much higher than usual, so it would be very costly if not impossible to design the infrastructure (server and communication network) for such peaks. The intuition that something can be done arises from the observation that the many viewers of the "hot" program are viewing the same material concurrently but not simultaneously. The various schemes for doing better than VOD in this situation are called "Near Video On Demand". The goal of NVOD is to provide an unlimited number of viewers of the same program similar service flexibility to that of VOD at a reasonable cost to the server and communication network. Ideally, this cost is independent of the number of viewers. "Near" is defined to mean commencement of viewing within a reasonable time interval following viewer request, for example one minute in the case of a movie, as well as the ability to pause and resume at any time. Rewind and fast-forward functions are not obligatory.

There are two categories of NVOD systems: open-loop systems and closed-loop systems. In both systems, the viewers are provided with devices, called herein "clients" because of their relationship with the server, that receive program copies transmitted by the server and display those copies to their respective viewers. In open-loop systems there is no feedback from the viewing client to the server, so neither server transmissions nor routing on the network are affected by viewer actions (other than the possible effect on routing due to a viewer joining a multicast group). Open-loop schemes lend themselves most naturally to broadcast-based networks, such as cable television networks, and even to networks that have only one-way communication, which is the common case in satellite-based information-dissemination networks. Closed-loop systems permit some feedback that allows the server to adjust to client requests throughout the viewing period. Note that the terms "play" and "display" are used interchangeably herein, to refer to the displaying of the received program by a client.

Recently, several open-loop NVOD schemes have been proposed. These schemes are based on partitioning the program into several segments, on the assumption that every client has a substantial amount of available storage capacity, for example on a hard disk, which can be used to temporarily store the segments. In such schemes, the server's transmission schedule, and the algorithm used by the client to decide whether or not to record any given transmitted segment, jointly ensure that every segment of the movie is stored in the client's recording medium by its viewing time.

One such scheme is taught by DeBey in U.S. Pat. No. 5,421,031, which is incorporated by reference for all purposes as if fully set forth herein. DeBey's partitioning and scheduling scheme is illustrated in FIG. 1, for the case of segments of equal length. The vertical axis of FIG. 1 is segment number. The horizontal axis of FIG. 1 is the time at which a given segment is broadcast by the server, with the unit of time, as well as the basic time interval, being the duration of one segment. For each segment, the time during which that segment is broadcast by the server is represented by a double-headed arrow. The first segment is broadcast in every time interval, the second segment is broadcast every second time interval, the third segment is broadcast every third time interval, and in general the n-th segment is broadcast every n-th time interval. Note that all segments are transmitted at the same transmission rate of one segment per time interval. In addition, the transmissions continue throughout the time period during which the viewers are permitted to view the program.

A client that tunes in to the broadcast at the beginning of any time interval receives all the segments promptly enough to display the program with no interruptions. For example, a client that tunes in at the beginning of the seventh time interval, and that actually begins to display the movie to its viewer at the beginning of the eighth time interval, receives and records the seventh copy of the first segment during the seventh time interval, the fourth copy of the second segment during the eighth time interval, the third copy of the third segment during the ninth time interval, the second copy of the fourth segment during the eighth time interval, etc. In this case, the first segment is displayed during the eighth time interval, the second segment is displayed during the ninth time interval, the third segment is displayed during the tenth time interval, the fourth segment is displayed during the eleventh time interval, etc.

DeBey's scheme imposes certain burdens on the server and on the clients. With N segments, the mean transmission bandwidth, in units of segments transmitted per time interval, is approximately ln(N); but the actual transmission bandwidth varies widely. For example, in prime-numbered time intervals after the first time interval, only two segments are broadcast, vs. e.g. six segments during the twelfth time interval. The client must be able to record the received segments fast enough to keep up with the peak aggregate transmission rate. Furthermore, the client must have enough storage capacity to store all recorded segments that are received too soon to play.

There is thus a widely recognized need for, and it would be highly advantageous to have, a NVOD method that imposes less of a burden on the resources available to the server and to the clients.

SUMMARY OF THE INVENTION

According to the present invention there is provided, in a system wherein a server transmits a program having a certain duration, the program being received by at least one client, a method for scheduling the transmission of the program, including the steps of: (a) partitioning the program into a plurality of sequential segments; (b) selecting a transmission rate for each segment, the transmission rate that is selected for a first the segment being faster than the transmission rate that is selected for any other the segment; and (c) transmitting the segments, by the server, each segment being transmitted at the transmission rate of the each segment.

According to the present invention there is provided a system for transmitting a program to a plurality of viewers, including: (a) a software module including a plurality of instructions for scheduling a transmission of the program by: (i) partitioning the program into a plurality of sequential segments, and (ii) selecting a transmission rate for each segment, the transmission rate that is selected for a first the segment being faster than the transmission rate that is selected for any other the segment; (b) a processor for executing the instructions; (c) a server for transmitting each segment at the respective transmission rate; and (d) for each viewer, a client for receiving the transmitted segments, recording the received segments and playing the recorded segments in the sequence.

According to the present invention there is provided, in a system wherein a server repeatedly transmits a program that is partitioned into a plurality of segments and wherein a client receives and records the segments and displays the program, the transmitting, receiving and recording of the segments being effected according to a schedule, a method for displaying the program intermittently, including the steps of: (a) transmitting, along with the segments, metadata describing the schedule, by the server; (b) pausing the display of the program, by the client; (c) resuming the display of the program, by the client, subsequent to the pausing; and (d) during the pausing, continuing to record at least a portion of the segments then received, by the client.

In its most basic embodiment, the present invention is a modification of the NVOD scheme of DeBey that smoothes out the instantaneous transmission bandwidth to always be close to the mean transmission bandwidth. This is accomplished by broadcasting all the segments concurrently, starting at the first time interval, but taking n time intervals to broadcast the n-th segment. In other words, if the first segment is transmitted at a transmission rate of T bits per unit time, then the n-th segment is transmitted at a transmission rate of T/n bits per unit time. This is illustrated in FIG. 2. Note that all transmissions end at the same times as in FIG. 1, but start at different times. Specifically, all the first transmissions of all the segments start at the beginning of the first time interval; and subsequently, as soon as the transmission of any segment ends, that segment is immediately retransmitted.

The simultaneous commencement shown in FIG. 2 is illustrative, and applies primarily to the basic embodiment illustrated therein. More generally, because the segments are transmitted repetitively and concurrently throughout the period during which the program is being offered to the viewers, the starting times of the transmission of different segments may be chosen at will.

The most basic embodiment of the present invention relieves the burden on the server, but not necessarily the burden on the clients. For example, a client that tunes in must receive and record all the data being transmitted until such time as it has finished recording a given segment and can cease recording the data for that segment. Thus, this client must be capable of receiving and recording data at a rate equal to the server's aggregate transmission rate. Furthermore, towards the middle of the program, the client's storage medium must have sufficient capacity to store a significant portion of the program even if the client discards the data of a segment once it is displayed. These stringent requirements may be relaxed if the start of the recording by a client of later segments is delayed long enough for earlier segments to be recorded, displayed and possibly even discarded, thus freeing up client resources to accommodate the later segments. Clearly, this implies an increase in the aggregate transmission rate, because a segment must be transmitted in its entirely during the time in which it is being recorded by the client; so that shortening this time without changing segment size mandates an increase in its transmission rate. In fact, the optimum overall system design is a tradeoff between minimizing the aggregate transmission rate and meeting client constraints such as limited recording rate and limited storage capacity. The ability to optimally design the system to optimize certain aspects of performance while adhering to constraints on others is a salient feature of the current invention. Algorithms for minimizing the aggregate transmission bandwidth subject to these constraints are presented in the Appendix.

More generally, the scope of the present invention includes NVOD methods and systems in which the first segment is transmitted at a higher transmission rate than the subsequent segments. Preferably, transmission rates of successive program segments are such that the latest time, measured from the time of a client's viewing request, at which the client may begin to record a segment such that the recording of the segment is completed before that segment must be displayed, is no earlier for a later program segment than for an earlier one. It should be noted that this transmission rate of a segment is defined in terms of the overall transmission rate of the segment as a whole. For example, a server may use time division multiplexing to transmit all the segments concurrently on a single channel, by partitioning the segments into subsegments, interleaving the subsegments and transmitting all the subsegments at the same rate. Consider, for example, in the context of the most basic embodiment of the present invention, a case in which 100-second segments are partitioned into 1-second subsegments of B bits each, that are transmitted on a 1 gigabit-per-second channel. The duration of the transmission of each subsegment is $B \times 10^{-9}$ seconds, no matter which segment is the source of the subsegment; but the 100 subsegments of the first segment are transmitted over the course of 100 seconds, for an overall transmission rate of B bits per second, whereas the 100 subsegments of the second segment are transmitted over the course of 200 seconds, for an overall transmission rate of B/2 bits per second.

It also is clear that a client may ignore, and not record, transmitted copies of any particular segment, until the transmission of the last such copy that is transmitted in its entirety before the segment must be displayed. To facilitate this, each transmitted copy of the segment includes metadata that describe various aspects of the segment, including, for example, the segment number, the size of the segment, the transmission rate of the segment, and a temporal value related to the time interval between the start of the transmission of this copy of the segment and the start of the transmission of the next copy of the segment. An example of this temporal value is the length of this time interval itself. Similarly, in an embodiment of the present invention in which the segments are partitioned into subsegments, each copy of a subsegment includes metadata that describe various aspects of the subsegment, including, for example, the number of the segment to which the subsegment belongs, the sequence number of the subsegment within its segment, the size of the subsegment, and a temporal value related to the time interval between the start of the transmission of this copy of the subsegment and the start of the transmission of the next copy of the subsegment.

When a segment is not partitioned into subsegments, the preferred embodiments of the current invention nonetheless include metadata that provides sufficient identification so as to permit the recording of the segment's data to begin without waiting for the beginning of the segment. Similarly, when a segment is partitioned into subsegments, the metadata permits the subsegments to be recorded by the client in any order and to subsequently be assembled to form the original segment. Thus, the recording of a given segment by a client may commence essentially as late as one transmission time of the entire segment prior to the earliest time at which that segment may have to be displayed. The time to transmit the entire segment is, in turn, essentially equal to the size of the segment divided by the rate at which the segment is transmitted. Similarly, as soon as a segment is displayed, that segment may be deleted from the recording medium to free up the storage space occupied by that segment.

In one preferred embodiment of the present invention, the subsegments of at least one program segment are used to compute a larger number of such subsegments, such that the original segment can be derived from any sufficiently large subset of the subsegments; and all the subsegments are transmitted such that the time between successive transmissions of the same subsegment remains unchanged. This increases the transmission rate of the segment, but permits the use of error correcting codes to receive the segment successfully even in the event of communication problems.

In one application of the present invention, in order to allow a viewer to tune in to a broadcast of an entire live program after the program has started but before the program has ended, the basic embodiment of the present invention is initiated simultaneously with the live broadcast, with the repeated transmission of each segment initiated after the live transmission of that segment.

In some embodiments of the present invention, only one copy of each segment is stored at the server. In other embodiments of the present invention, multiple copies of the program data are stored at the server, to increase the efficiency of storage access when transmitting the program.

Optionally, the segments are encrypted and/or compressed by the server prior to transmission, and are decrypted and/or decompressed by each client prior to display.

A system of the present invention includes a software module that embodies the algorithm of the present invention, a processor for executing the instructions of the software module, and a server that includes both a data storage area for storing the program segments and a mechanism for transmitting the program segments according to the transmission rates assigned by the algorithm. Preferably, the software module and the processor also are included in the server; although it also is possible, within the scope of the present invention, for the server to obtain a rate allocation table or a transmission schedule from another device that includes the software module and the processor of the present invention and that operates off-line. The system also includes, for each viewer, a client for receiving, recording and displaying the segments, and a distribution network for broadcasting the segments to the clients.

The scope of the present invention also includes a method for pausing and resuming the display of the program by a client, whether the NVOD transmission rates are selected according to the teachings of the present invention or according to prior art schemes such as DeBey's. Essentially, the client stops displaying the program, but continues to record incoming segments as though the program were being displayed at the point, in the program, where the display was temporarily stopped. To conserve the client's storage space, metadata are transmitted along with the segments to indicate when the segments will be transmitted again, and segments that will be transmitted and recorded again before they need to be displayed, if displaying were to be resumed immediately, are discarded.

BRIEF DESCRIPTION OF THE DRAWINGS

The invention is herein described, by way of example only, with reference to the accompanying drawings, wherein:

FIG. 2 is a graphical representation of the NVOD scheduling scheme of the present invention;

DESCRIPTION OF THE PREFERRED EMBODIMENTS

The present invention is of a NVOD method and system for transmitting a program to a plurality of viewers for on-demand viewing. Specifically, the present invention can be used by the viewers to view the program continuously, without undue burden on system resources.

The principles and operation of NVOD according to the present invention may be better understood with reference to the drawings and the accompanying description.

The Appendix presents an analysis of the present invention, and preferred methods for assigning transmission rates to program segments according to the present invention, for the special case of a program partitioned into segments of equal length. Nevertheless, the scope of the present invention includes the use of segments of unequal length.

The analysis and the methods presented in the Appendix are directed towards three system parameters, the aggregate server transmission bandwidth $R_t$, the peak client recording rate $R_r$ and the required client storage capacity $S_{max}$. Specifically, the algorithms presented in the Appendix are for minimizing $R_t$ subject to the constraints of particular values of $R_r$ and $S_{max}$. Note that the terms "aggregate transmission rate" and "aggregate transmission bandwidth" are used interchangeably herein. The program is partitioned into L sequential segments indexed by an index m. The time at which the client begins recording segment m is denoted by s(m). The time at which a viewer begins to view segment m is denoted by v(m). In particular, v(1) is equal to the permissible delay from the time of a viewer's request to view a program until the viewer's client begins displaying the program. Recording by the client begins immediately upon the viewing request. The rate at which a particular segment m is transmitted by the server is denoted by $r_t(m)$. In order to guarantee that all the data of segment m is present at the client when the segment is displayed, s(m)<v(m)−(size of segment m)/$r_t(m)$. As noted above, the principle of the present invention, in its most general form, is to use $r_t(m>1)$ <$r_t(1)$. Also as noted above, it is preferable to assign $r_t(m)$ such that s($m_2$)≧s($m_1$) if and only if $m_2$>$m_1$, i.e., the times at which the recording of successive segments begins form a monotonically non-decreasing sequence. In the basic embodiment, $r_t(m)$ is proportional to 1/m. The algorithms presented in the Appendix minimize $R_t$, subject to the constraints, by systematically increasing s(m) of the basic embodiment (thereby increasing $r_t(m)$) to ensure that the amount of storage in the client's recording medium occupied by recorded segments never exceeds $S_{max}$ and/or that the rate at which the client records incoming segments never exceeds $R_r$. These algorithms also can be used by one skilled in the art to minimize any one of the client storage requirement, or the client's peak recording rate, subject to constraints on $R_t$ and the other parameters.

Figure 1:
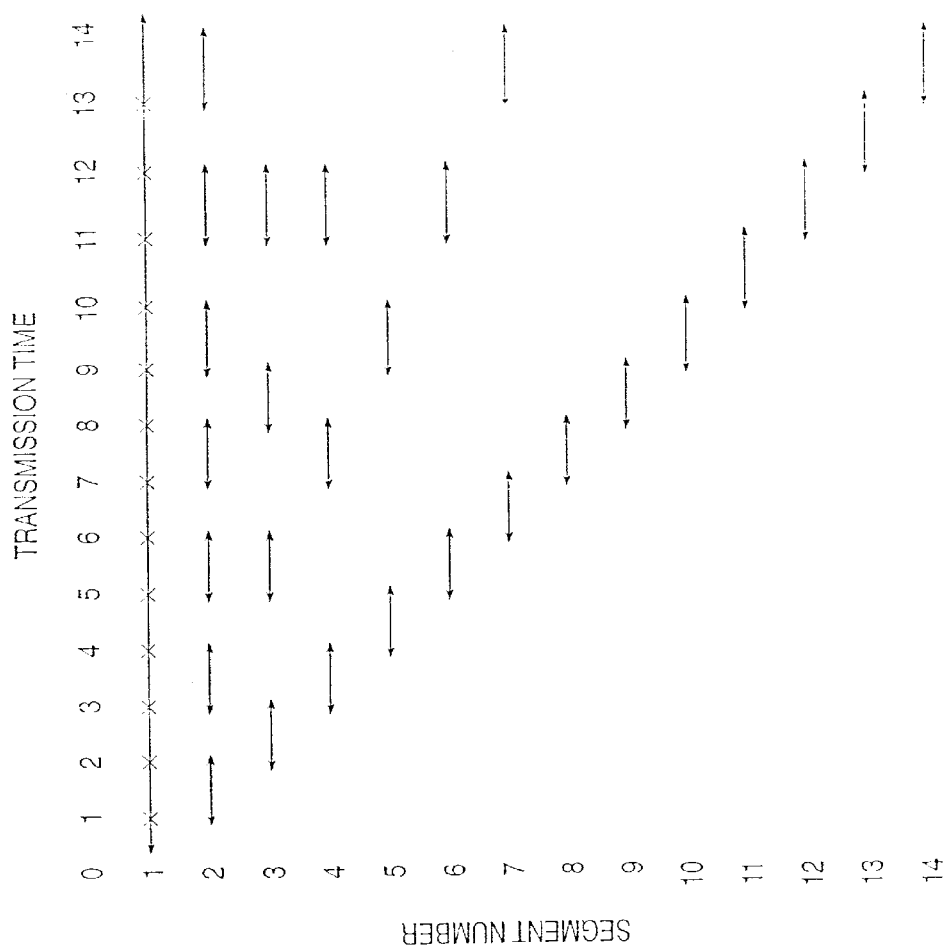
FIG. 1 is a graphical representation of a prior art NVOD scheduling scheme.
Figure 3A:
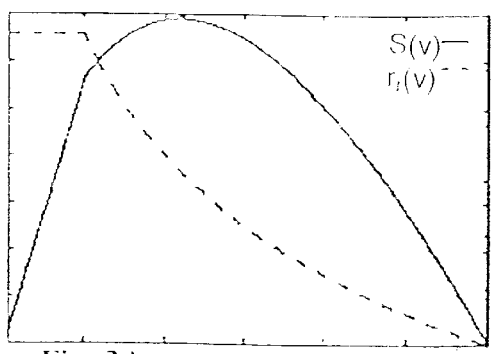
FIG. 3 shows eight snapshots of the execution of an algorithm for minimizing the aggregate server transmission bandwidth subject to constraints on client storage capacity and recording rate.
Figure 3B:
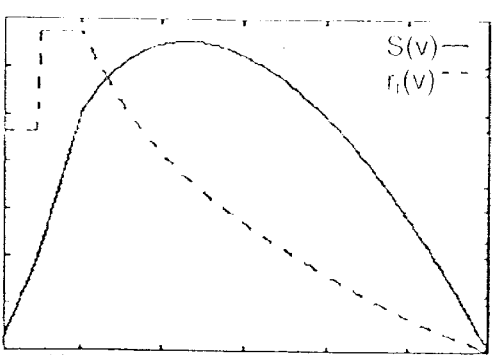
Figure 3C:
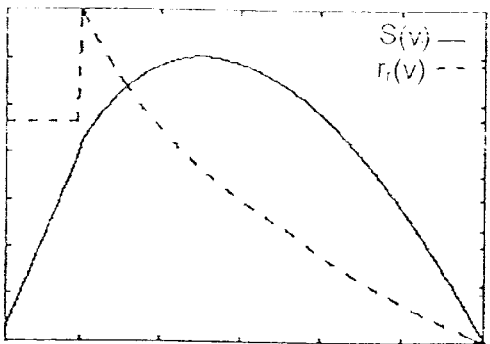
Figure 3D:
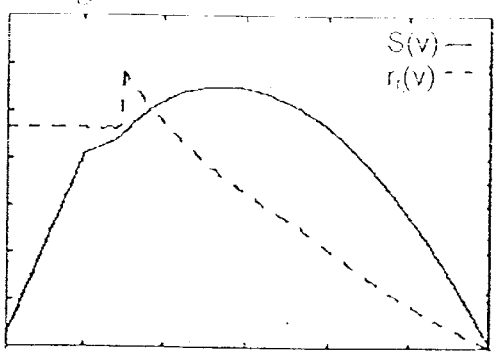
Figure 3E:
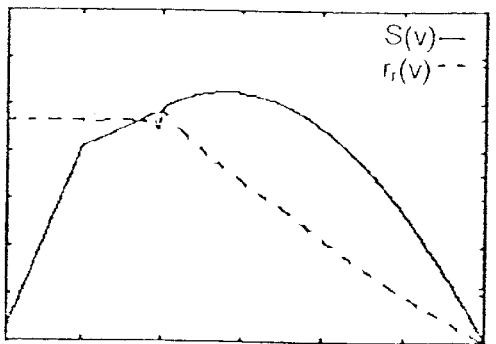
Figure 3F:
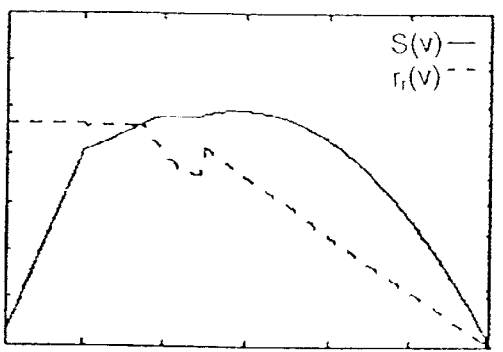
Figure 3G:
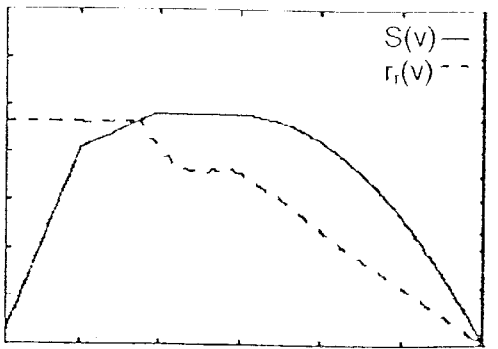
Figure 3H:
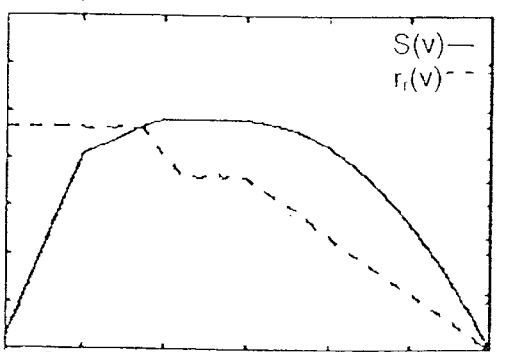

Referring again to the drawings, frames A–H of FIG. 3, which is identical to FIG. 1 of the Appendix, show eight stages of an algorithm that minimizes $R_t$ subject to particular fixed maximum values of $S_{max}$ and $R_r$. The frames represent snapshots of the progress of a transmission-rate assignment algorithm of the present invention. Each snapshot depicts the recording rate $r_r(v)$ and the amount of storage used by a client, S(v), as a function of the elapsed time v since the client requested the viewing of the program, as calculated by the algorithm at eight different stages in the progress of the algorithm. The axes are intentionally uncalibrated but are linear, and the point at which both storage and recording rate drop to zero is the end of the viewing of the program. The transmission-rate assignments themselves are not shown. It can be seen that the assignment algorithm considers viewing times from earliest to latest, so successive snapshots differ primarily at the higher values of the viewing time v. FIG. 3A depicts the unconstrained minimum transmission rate solution (the most basic embodiment of the present invention): $r_r(v)$ is fixed until v=v(1), the time at which viewing of the first segment commences, because s(m)=0 for all m and all segments are being recorded; and S(v) increases linearly during this time interval. After the display of the program begins, the recording of segments gradually comes to an end, with the highest-rate (earliest) segments being dropped first. S(v) is the integral with respect to time of recording rate minus the fixed viewing rate. In FIG. 3A, S(v) reaches a peak and then falls off gradually. FIGS. 3B, 3C and 3D show how the algorithm sweeps across viewing time, forcing the recording rate $r_r(v)$ down to the permissible upper limit. In so doing, the recording rate $r_r(v)$ for subsequent segments may actually increase, but storage never increases. The sudden rise in the recording-rate plot reveals the viewing time that is being addressed by the algorithm. In FIGS. 3E through 3G, storage becomes the limiting factor and the recording rate $r_r(v)$ falls below its permissible maximum. In FIG. 3H, the algorithm enters a regime in which both recording rate and storage consumption are below their upper limits at all times, and the algorithm stops.

Preferably, segments that are transmitted concurrently by the server are multiplexed on a common channel by a conventional multiplexing method such as time division multiplexing, frequency division multiplexing or code division multiplexing. As noted above, if time division multiplexing is used (and optionally if a different multiplexing method is used), each segment is partitioned into sequential subsegments. These subsegments need not be transmitted in their sequential order, although it is preferable that the transmission order of the subsegments be a cyclic permutation of the sequential order of the subsegments, and it is most preferable that the transmission order of the subsegments be identical to the sequential order of the subsegments. Also as noted above, each subsegment include metadata that indicates the sequential order of that subsegment within the corresponding segment, so that a client can start receiving a stream of subsegments in the middle of the sequence, and need not wait for the transmission of the sequence to start again from the beginning of the sequence.

Although the descriptions, herein and in the Appendix, of the present invention, all refer to a situation wherein a client does not store any portion of the program prior to the viewing request, the present invention also applies to the case in which the client does store a portion of the program in advance of viewing. Specifically, if the client stores the first t seconds of the program in advance, the present invention can be applied to the remainder of the program, excluding the first t seconds, with the first subsequent segment labeled as segment number one. The viewing time v still is measured from the time at which the viewing request is made, but v(1) is equal to the permissible delay from viewing request until the commencement of the display of the program plus t. The viewing times of later segments then differ from v(1) by the same amount as when no portion of the program is stored at the client prior to the viewing request.

Figure 4:
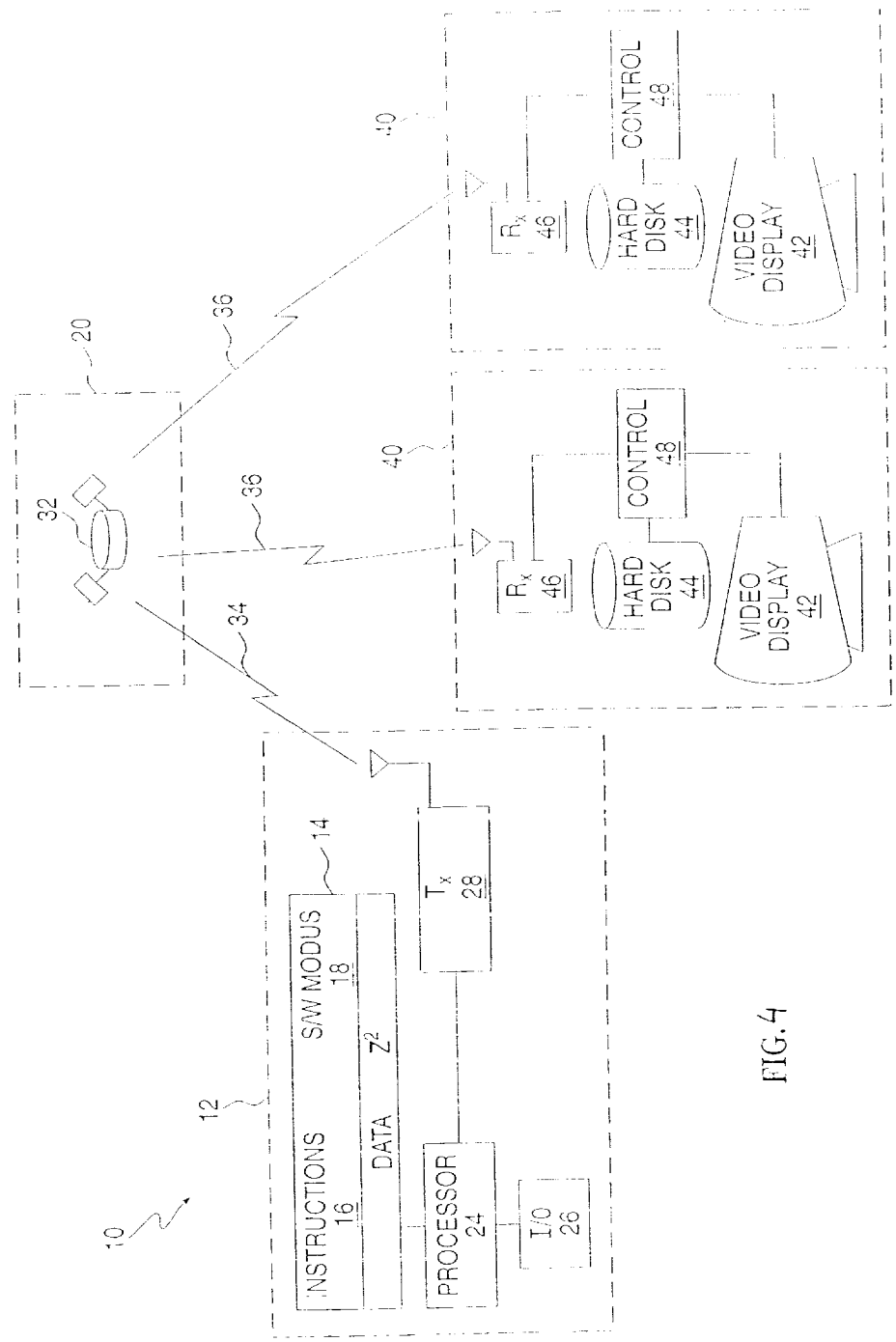
FIG. 4 is a schematic diagram of a system of the present invention.

FIG. 4 is a schematic block diagram of a system 10 of the present invention. The high level components of system 10 include a server 12, a distribution network 30 and several clients 40.

Server 12 stores the program and transmits the program to distribution network 30 according to the NVOD transmission rate assignments of the present invention. Server 10 includes a processor 24; one or more storage/memory units indicated collectively by reference numeral 14; a set of input/output devices, such as a keyboard, a floppy disk drive, a modem and a video monitor, represented collectively by I/O block 26; and a mechanism for transmitting the program to clients 40 via distribution network 30, represented by a transmitter 28. Memory 14 includes an instruction storage area 16 and a data storage area 22. Within instruction storage area 16 is a software module 18 including a set of instructions which, when executed by processor 24, enable processor 24 to schedule the transmission of the program in accordance with the teachings of the present invention.

Using the appropriate input device 26, source code of software module 18, in a suitable high level language, for implementing the scheduling algorithms of the present invention and for scheduling the actual transmission of segments of the program in accordance with the output of one of the algorithms, is loaded into instruction storage area 16. Selecting a suitable language for the instructions of software module 18 is easily done by one ordinarily skilled in the art. The language selected should be compatible with the hardware of server 12, including processor 24, and with the operating system of server 12. Examples of suitable languages include but are not limited to compiled languages such as FORTRAN, C and C++. If a compiled language is selected, a suitable compiler is loaded into instruction storage area 16. Following the instructions of the compiler, processor 24 turns the source code into machine-language instructions, which also are stored in instruction storage area 16 and which constitute a portion of software module 18. Using the appropriate input device 26, the program is loaded into data storage area 22. Following the machine-language instructions of software module 18, processor 24 partitions the stored program into segments, schedules the transmission of the segments and directs transmitter 28 to transmit the segments according to the schedule.

Distribution network 30 carries the transmitted segments to clients 40. Distribution network 30 is illustrated in FIG. 4 as a satellite network, including at least one satellite 32, an uplink channel 34 from server 12 to satellite 32 and multiple downlink channels 36 from satellite 32 to clients 40. Alternatively, distribution network 30 is a cable television distribution network, a network based on telephone lines, a network based on optical fibers, a special-purpose network, or any suitable local-, metropolitan- or wide-area network. Preferably, distribution network 30 supports the transmission of information packets to multiple recipients.

Each client 40 includes a receiver unit 46 for receiving the transmitted segments (for example, from downlink channel 36); a recording medium, represented in FIG. 4 as a hard disk 44, for storing received segments until those segments are displayed; a video display unit 42 for displaying the recorded segments consecutively in their sequential order; and a microprocessor-based control unit 48 for controlling the overall operation of client 40. Receiver unit 46 is chosen to be appropriate to distribution network 30. For example, if distribution network 30 is a satellite network, as shown, then receiver unit 46 is a satellite transmission receiver, and if distribution network 30 is a cable television distribution network, then receiver unit 46 is a modem. Client 40 receives the transmitted data, selects the data that should be recorded on recording medium 44, reorders the data to reconstruct the original program sequence, decompresses the data if necessary, and displays the data on video display 42. Additionally, client 40 is responsive to viewer commands (play, pause, stop, rewind) directed to control unit 48 via a conventional input device (not shown) such as a keyboard or a remote control device. Control unit 48 makes its decisions based on the viewer commands it receives, on the viewing time v, on the contents of recording medium 44, and on the scheduling information that is embedded in the received data or that is supplied separately. After displaying a segment, client 40 either discards that segment or continues to save the segment in recording medium 44 in support of rewind. Client 40 may be an autonomous unit such as a suitably configured personal computer or television set. Alternatively, components 44, 46 and 48 of client 40 may be embodied in a stand-alone unit such as a television set-top box, for use with a television set that serves as video display 42.

Because the clocks of server 12 and client 40 may operate at slightly different rates, and because server 12 transmits the same data to all clients 40, client 40 preferably is capable of synchronizing to the server clock.

In addition to the segments and the metadata, the information transmitted by server 12 to clients 40 optionally includes request/billing information that enables a viewer to select a program from a menu of offered programs and that enables the provider to record and charge for the transaction. This information may also include a "password" that server 12 transmits to a client 40 to enable that client 40 to display a particular program.

Typically, client 40 uses a secondary storage device such as a hard disk as its main recording medium 44. Client 40 may also have a substantial amount of primary (random access) memory. Preferably, client 40 uses the available primary memory in order to buffer certain program segments until their playback time, thus obviating the need to store these program segments in main recording medium 44 and read these program segments from main recording medium 44. This is particularly useful for the earliest segments of the program, because these segments are received and played at a time in which the client recording rate is at its maximum and hard disk bandwidth is stressed. In this preferred embodiment, the main memory that is available for this purpose is used to store the newly received segments whose playback time is the earliest. If received data belongs to an earlier (in the program and thus in terms of playback time) segment than one whose data is already being buffered in the primary memory, the data of the latter is evacuated to main recording medium 44 in favor of the newly received data. In this embodiment, the transmission-rate allocation algorithm is modified to reflect the fact that certain early segments of the program are never recorded in main recording medium 44 or read from main recording medium 44. This permits the aggregate transmission bandwidth from server 12 to be reduced if that aggregate transmission bandwidth was originally determined by the constraint on recording rate. The peak storage requirement at client 40 is unaffected by the choice of storage medium for early program segments.

As noted above, the scope of the present invention includes the partition of the program into segments of unequal length. Appropriate modifications must be made to the algorithms described in the Appendix to account for segments of unequal length. Each such segment is characterized by a size (in bytes) and the time (in seconds since the start of playing of the program) at which the display of the segment must begin. The transmission rate assigned to a segment is obtained by dividing the size of the segment by the difference in time between the time at which display of the segment begins and the time at which the recording of the segment begins: $r_t(m)$ size(m)/(v(m)−s(m)). Optionally, the sequence of points in time at which the algorithm is applied are the (irregularly spaced) points in time at which the displays of the different segments begin.

In its basic form, the present invention assumes that the entire program is available to server 12 at the outset, e.g. in a file. Thus, the transmission of all segments can take place in an effectively concurrent manner, and a client 40 can begin recording any segment at any time. There are, however, situations wherein it is desired to permit the viewing in NVOD mode to commence even before the original (live) event has been completed. For example, it is desired to permit the viewing of a one-hour news program to begin at any time after its actual beginning, not only after it is over. The basic NVOD scheme does not work in this case, because the recording of (particularly late) segments by client 40 must begin before the corresponding real event took place.

In order to permit delayed viewing to begin even while the live event is still taking place, the basic scheme is extended as follows:

The live event is transmitted once, as it takes place, at the nominal video rate. The transmission of the first live segment also triggers the beginning of the (infinitely repetitive) NVOD schedule of the basic scheme. Segments that have yet to happen are simply not transmitted. The two constituent transmissions are integrated to form a single data stream. This stream, in addition to the data itself, contains information that permits client 40 to know when a given block of data will be transmitted again, or equivalent information that enables client 40 to decide whether client 40 must record the current instance of a given piece of data. A joining client 40 receives both the remainder of the "live stream" and the basic NVOD transmissions. This client 40 records, from both sources, data that will not be received again before the earliest time at which this client 40 may need such data for viewing. As soon as the live event is over, the "live stream" terminates and system 10 again operates in the basic NVOD mode.

The aggregate transmission rate is initially lower than with the basic NVOD scheme, because there is hardly any data to transmit aside from the "live" stream. As the live event progresses, however, the rate increases and eventually reaches the full NVOD rate plus the live video rate. Once the live event is over, the aggregate transmission rate drops to the NVOD rate. In a most preferred embodiment of the present invention, the amount of additional transmission bandwidth is reduced by increasing the individual NVOD transmission rates, of program segments that are already available because the corresponding part of the live event has already occurred, during the initial portions of the live event and gradually reducing the NVOD transmission rates to below the original NVOD transmission rate toward the later parts of the live event. The exact details vary between implementations and can be worked out by one ordinarily skilled in the art.

It is well known that communication channels are imperfect due to a variety of reasons. In order to overcome errors, it is common to use error correcting codes. These entail the generation of redundant information that is derived from the original information, such that a sufficiently large subset of the total (redundant plus original) information suffices for the reconstruction of the original information. The aggregate transmission rate is increased in a manner commensurate with the degree of redundancy. For example, if the amount of data transmitted for each segment is increased by a factor of k+r)/k, then the transmission rate must be increased by the same factor. In some preferred embodiments of the present invention, such codes are constructed by dividing each program segment into subsegments of equal sizes, and deriving redundant subsegments from those subsegments. This technique is advantageous over the more common one, wherein redundant information is appended to each subsegment and serves to overcome errors within that segment. Specifically, the advantage of the technique of the present invention is that the technique of the present invention is more resilient than the more common technique to bursts of errors, because the redundant information is transmitted distantly (in time) from the original information. Thus, a burst of errors destroys small portions of different segments rather than a large portion of a single segment.

Error correcting codes usually entail the computation of redundant information from the original information and the transmission of the original information as well as the redundant information. A different flavor of codes entails computation of information from the original information such that the total number of bits is larger than the original number of bits, and such the original information can be derived from a sufficiently large subset of the fall set of bits. In both cases, repetitive transmission of a segment entails the repeated transmission of the total information derived from the original information. So doing, including the special case of no redundant information, requires that client 40 continue to be active even when pausing. As is described in the Appendix, while pausing, client 40 continues to record portions of segments while discarding other portions of those segments. The reason is that, although the fraction of any given segment that must still be recorded before the segment can be viewed does not change with time while client 40 is pausing, the portion (content) of the segment, that will be transmitted between the current time and the time at which the segment will be viewed if playing is resumed at the current time, changes. For example, if a pausing client 40 has recorded the first half of a segment at the time of pausing, this client 40 still needs the second half of that segment. If this client 40 pauses for a time equal to the transmission time of one quarter of that segment and does not record during that time, the missing fraction remains unchanged. However, because transmission has progressed, the fraction of the segment that will be transmitted between resumption of playing and the viewing time of this segment will comprise the fourth quarter of the segment followed by the first quarter of the segment. The third quarter of the segment will thus be missing.

For the reasons just explained, it is also clear that, because the viewing time is frozen while pausing, whereas transmission by the server continues, certain already recorded portions of some segments are certain to be transmitted again prior to the earliest time at which these segments may have to be displayed subsequent to the resumption of viewing. These portions may be discarded by the client. In order to enable the client to decide whether to discard these portions, the client stores (at all times) the actual (real) time at which any given portion is recorded, as well as the metadata identifying when that portion will next be transmitted.

It is sometimes desirable to cease the recording when pausing. This may be due to a need to use the client computer for other purposes or due to a need to interrupt the communication. In order to permit this, one preferred embodiment of the present invention uses a code that entails the generation of a sequence of subsegments derived from the original segment such that the sequence is much longer than the number of subsegments that are required for reconstruction of the original segment. Furthermore, any sufficiently large subset of the subsegments suffices for this reconstruction. Thus, as long as the transmission time of the entire sequence of subsegments is sufficiently longer than the pausing time, the subsegments recorded by client 40 prior to pausing and the subsegments recorded by client 40 after resuming will all be different, and reconstruction will be possible. An example of such a code is the well-known Reed-Solomon code. Another suitable type of codes is Tornado codes.

In its basic form, system 10 entails transmission of data by server 12, such that all the data is received by all clients 40, and each client 40 selects the relevant portions of the data for recording in its memory or disk buffers. This is referred to as "broadcast and select", and is appropriate for situations wherein the transmission medium is a broadcast channel (e.g., satellite and cable television) and wherein the permissible transmission rate on a single channel equals or exceeds the aggregate transmission rate required for providing the NVOD service and wherein each client 40 is capable of receiving data into memory at a rate equal to this aggregate rate. This is not always the case. Nevertheless, the present invention is applicable to such situations.

One important configuration in which this problem occurs involves the use of telephone lines to reach the client location. These "digital subscriber loops" are inherently point-to-point, with different (physical or logical) lines going to each client 40, and the permissible data rate over each such line is lower than the aggregate NVOD transmission rate. One preferred embodiment of the method of the present invention for this situation is to execute the selection function at the distant (from client 40) end of the telephone line. This end of the line is referred to herein as the "server side" of the line. By so doing, server 40 still transmits at the same rate as before, but the data rate over the private line of any given client 40 is only the recording rate, which varies with time and is initially higher than the video rate, but is substantially lower than the NVOD transmission rate. In order for this scheme to work, client 40 must advise its "agent" at the "server side" of its request to start viewing and of any pausing and resumption. The agent, located on the server side of the private communication line, acts as a filter on behalf of client 40, receiving all transmitted data but refraining from transmitting to client 40 over the private line at least some of the segments that do not need to be recorded by client 40, e.g., segments that have already been viewed by client 40. Indeed, this agent must be able to receive (but not necessarily store on disk) at the full NVOD transmission rate. Another way to think of this is that the filtration that otherwise would occur in client 40, resulting in the recording of only relevant portions of the received data, is carried out at the server-end of the private line, thereby reducing the data rate on the private line from $R_t$ to a lower value, possibly as low as $r_r(v)$.

Another important configuration entails the use of cable television or satellite, such that the entire NVOD transmission can be carried over a single channel and the modem of client 40 can listen to all transmissions, but the permissible data rate between the modem and control unit 48 is lower than the channel rate. With current cable modems made by Motorola, for example, the data rate over a single cable channel is 30 Mbit/sec, but the connection between the cable modem and the client computer is a 10 Mbit/sec Ethernet connection. One preferred embodiment of the present invention for dealing with such a situation entails the use of multiple destination addresses, as follows:

Each program segment is transmitted at the rate determined by the NVOD transmission-rate allocation scheme to at least one of the destination addresses. Each client 40, depending on the viewing time of that client 40, accepts data that is destined to a particular subset of the destination addresses. Because certain segments may be transmitted to more than one destination address and are thus transmitted concurrently more than once, this technique increases the aggregate transmission rate. The segments can be grouped in various ways for this purpose, representing a trade-off between transmission rate, the data rate that a client 40 must receive, and the number of destination addresses for which a client 40 must be able to receive data. Because each transmitted data packet is generally received by some subset of clients 40, this kind of transmission is referred to as multicast.

In another preferred embodiment of the present invention for dealing with this situation, the microcontroller that is part of the cable modem is programmed to act as the server-side agent that was referred to in the example of digital subscriber loops, passing on to client 40 only those segments that client 40 should record.

Yet another important situation occurs when the permissible data rate over a single channel is lower than the aggregate NVOD transmission rate. A preferred embodiment of the present invention in this case entails the transmission of any given segment over at least one channel. At any given time, any given client 40 receives the data transmitted over a subset of the channels. This subset depends on the allocation of segments to channels and on the point in the program that is being viewed at that time. For a given channel data rate, the assignment of segments to channels represents a trade-off between the aggregate transmission rate and the number of channels from which a client 40 must receive data concurrently.

In one preferred embodiment of the present invention, any piece of data is stored in data storage area 22 of server 12 exactly once, and data are read for transmission as required by the transmission rates of the various program segments. This storage scheme minimizes storage requirements in server 12; but if data storage area 22 is implemented as a hard disk, this storage scheme requires numerous seek operations in order to bring the disk reading head to the location of the data that are to be transmitted. In another embodiment of the present invention, wherein each segment is partitioned into subsegments and the concurrent transmission of the segments at their respective transmission rates is carried out by appropriately interleaving the transmission of their subsegments over a common channel, the program data are recorded sequentially on disk in the order in which the interleaved subsegments are transmitted over the channel. The recorded sequence is of sufficient length, on the order of the viewing time of the entire program. This substantially increases storage requirements in data storage area 22 of server 12, but requires no seek operations and thus substantially increases the hard disk's effective data rate.

As noted above, in order for client 40 to decide which data client 40 should record and to correctly reassemble the program, client 40 must know the location within the program of arriving data and whether this data will be received again prior to the earliest possible time at which this client may have to play it for viewing. Again as noted above, in one preferred embodiment of the present invention, each program segment is partitioned into subsegments. Additionally, each transmitted subsegment contains a unique sequence number that identifies the sequence order of that subsegment in the program, as well as the elapsed time from the current transmission of that subsegment until that subsegment will be transmitted again. In another preferred embodiment of the present invention, each subsegment is tagged with its sequence number in the program and also contains that size (in bytes) and transmission rate assigned to the segment to which that subsegment belongs. In yet another embodiment, a subsegment is tagged with its sequence number and server 12 periodically transmits metadata advising clients 40 of the transmission rate assigned to each segment.

When the "long" error-correcting code sequences are used, the time until next transmission of a particular subsegment is irrelevant. Instead, if the degree of redundancy is such that the frequency with which subsegments of a segment are transmitted is greater by a factor of $(k+r)/k$ relative to the frequency in the absence of error correction, the preferred embodiment of the present invention is as follows: each subsegment contains its sequence number in the program and the time until the next transmission of the subsegment (of the same segment) that is $k+r$ later than itself in the code generated for this segment. In the event that the end of the code sequence is reached, counting continues with the first subsegment in the code sequence for this segment. Another embodiment of the present invention entails the transmission of the sequence number, the segment size (size of k+r subsegments) and the transmission rate allocated to each segment.

Instead of discarding program segments that have been viewed, one preferred embodiment of the present invention retains these segments in recording medium 44 of client 40 in order to permit re-viewing of portions that have been viewed. In one variant of this preferred embodiment of the present invention, segments are only discarded when the storage space devoted to storing the segments in recording medium 44 would otherwise exceed the specified limit (note that the storage space is unused at the beginning and at the end of the display of the program, so there are long periods during which there is extra space). Also in this variant, the order in which segments are discarded is the same as their order in the program. In another variant of this preferred embodiment of the present invention, a minimum required rewind distance is specified and the corresponding amount of storage space in recording medium 44 is reserved for this purpose. The transmission scheme is designed based on an available storage space in recording medium 44 that is equal to the specified available storage space minus the reserved space. The discarding policy is the same as in the first variant.

System 10 optionally includes means of encrypting the transmitted data or a part thereof such that a client 40 must receive authorization from the service provider in order to be able to view a given program. This authorization may be in the form of a password, and may be transmitted through the same channel as the program or provided by other means. According to one embodiment of the present invention, server 12 transmits, with each program, information pertaining to the charge for viewing that program, and the viewer uses a smart card (cash card or credit card) to pay, with the payment occurring at the client site, to enable client 40 (which is trusted by server 12) to present the program to the viewer.

The embodiments presented above of the NVOD transmission are based on accommodating the least capable client 40. Thus, all clients 40 can successfully participate. However, there are situations in which accommodating the less capable clients 40 (e.g., clients 40 that have much smaller storage space than the other clients 40) would result in an excessive transmission rate. The alternative is reduction in video rate (more lossy compression and lower quality), which may be unacceptable to the capable clients 40. To alleviate this problem, an extension of the NVOD system and method of the present invention entails the use of progressive encoding of the program segments. According to this well-known method in the art of data compression, a fraction of a compressed segment suffices for its reconstruction, albeit at a reduced quality. In one embodiment of the present invention, every segment of the program is compressed according to a progressive compression scheme and is partitioned into two pieces such that the first piece of any given segment suffices for the reconstruction of that segment, albeit at a lower quality. The first pieces of all segments are then treated as one program, and the second pieces of all segments are treated as a second program. The first pieces are assigned transmission rates so as to satisfy the resource constraints of the "poor" clients 40 while minimizing aggregate transmission bandwidth. Concurrently, the "program" containing the second pieces of every segment is assigned transmission rates so as to satisfy the constraints of the "rich" clients 40, having first subtracted from those the resources taken up by the first "program". (This idea can be generalized by those skilled in the art to more than two levels of clients 40 and qualities.) The exact allocation of resources and size between the first and second pieces of segments is determined by constraints of the compression scheme and also represents a trade-off between the quality received by the less capable clients 40 and the (higher) quality received by the more capable clients 40.

The pausing algorithm of the present invention is described schematically as follows in the Appendix:

---

Upon receipt of Pause command: {
    freeze the viewing clock at the current value of v;
    while pausing {
        continue receiving and recording data as if viewing at time v;
        drop the "oldest" bits for each segments as new ones arrive
           (FIFO);
        }
    }
    Upon receipt of Resume command: release the viewing clock and
        resume normal operation;

---

As noted above, v is the time at which the display of the respective segment commences, relative to when display of the program was requested by the viewer.

Although the algorithms in the Appendix, including the pausing algorithm, are defined in terms of segments, it will be clear to those skilled in the art how to implement the pausing algorithm in the context of subsegments as described above. For example, the necessity of continued recording during the pause is discussed above in terms of a segment, half of which is recorded by client 40 at the time of pausing.

While client 40 pauses, client 40 behaves as though frozen in time, so that if client 40 requests display of a program of duration T at time $t_0$, starts displaying the program at time $t_1$, pauses at time $t_2$ ($t_2-t_1<T$), and resumes display at time $t_3$, the data stored by that client 40 in recording medium 44 at time $t_3$, when display resumes, is the same as the data that would be stored at time $t_3$ by a client that requested display at time $t_0+(t_3-t_2)$, started displaying at time $t_1+(t_3-t_2)$ and did not pause. In particular, when display resumes, display commencement times v of segments yet to be displayed are with reference to $t_0+(t_3-t_2)$ rather than to $t_0$.

The metadata transmitted by server 12 includes, for each segment or for each subsegment, information about when (in terms of clock time, not in terms of display commencement time v) that segment or subsegment will next be transmitted. Client 40 records, for each recorded segment or subsegment, the time at which that segment or subsegment was recorded, and the time at which that segment or subsegment next will be transmitted. This enables client 40 to conserve storage space in medium 44: as needed, client 40 discards segments or subsegments that will be transmitted and recorded again in time to be displayed at their respective display commencement times v referred to $t_0+(t_3-t_2)$.

While the invention has been described with respect to a limited number of embodiments, it will be appreciated that many variations, modifications and other applications of the invention may be made.

33

APPENDIX

Tailor-Made transmission schedules for efficient Near-Video-On-Demand service

*Yitzhak Birk and Ron Mondri*

Electrical Engineering Dept., Technion

Haifa 32000, Israel birk@ee.technion.ac.il, mondri@tx.technion.ac.il

Abstract. Near-Video-On-Demand (NVOD) entails the provision of viewing flexibility that approaches that of VOD to an unlimited number of viewers of a "hot" movie at a fixed cost to the provider. "Near" might refer to viewing commencement within 30 seconds from viewer request as well as instant pausing and resumption. NVOD represents an exciting opportunity to service providers, especially when employing broadcast channels such as the cable television infrastructure or satellites. This paper assumes such a channel and that clients can temporarily store portions of the movie. This is typical of personal computers (and of many television sets and set-top boxes in the near future). We present the Tailor-Made method for designing extremely efficient open-loop transmission schedules for use by the server. Unlike previous approaches in the same framework, which were based on a mathematical model, Tailor-Made is an algorithmic method. Given the movie parameters, the permissible delay until viewing commences, a client's storage capacity and its recording rate (the same for all clients), Tailor-Made produces a transmission schedule that adheres to the constraints while minimizing server transmission rate. It can also be used as an "oracle" for minimizing any one of required client storage, recording bandwidth and delay until viewing commences if transmission rate and the remaining parameters are specified. The results dominate those of all previous schemes in flexibility as well as in resource consumption. In fact, the ability to tightly tailor resource consumption to availability constraints is sometimes key to the practicality of the service in a given environment.

1. Introduction

Video-On-Demand (VOD) is the online version of traditional video-rental services. As with those, each viewer receives a dedicated "copy" of the movie and can view it in a flexible manner, including the ability to pause and resume, rewind, and possibly even fast-forward. With VOD, the "rental" operation is essentially instantaneous, and viewing can begin within seconds of the decision to view.

The "copy" in VOD is a dedicated video stream. This stream is generated by a video server and sent to the viewer over a communication network. An important advantage of VOD over tape rental is the great flexibility in allocation of resources: the maximum number of concurrent viewers is independent of viewing choices, and is limited only by the server's total streaming capacity. The required bandwidth resources both in the server and in the communication network are proportional to the number of concurrent viewers.

The design of VOD systems has focused on the video servers themselves, with special attention to efficient bandwidth utilization of the storage devices. Related research pertains to data streaming over networks.

Near-Video-On-Demand (NVOD)

There are important situations in which a large number of people wish to view the same content during the same period of time, albeit not simultaneously. One example is viewing emergency-preparedness instruction in the hours or days prior to the arrival of a major storm. Another example is a newly released "hot" movie that is moreover advertised heavily. Yet another example might be a movie whose viewing is ...lor-Made transmission schedules for efficient NVOD service

34 assigned as homework, or even a recorded lecture viewed (individually) in class by the students.

Although VOD could be used to address such situations, it is both highly desirable and intuitively possible to do better. The desire stems from the fact that even the total (over all movies) number of concurrent viewers may be much higher than usual, so it would be very costly if not impossible to design the infrastructure (server and communication network) for such peaks. The intuition that something can be done arises from the observation that the many viewers of the "hot" title are viewing the same material concurrently, albeit not simultaneously. The various schemes for doing better than VOD in this situation are dubbed *"Near Video On Demand"*. NVOD can be defined as providing an unlimited number of viewers of the same movie similar service flexibility to that of VOD at a reasonable cost to the server and communication network. Ideally, this cost is independent of the number of viewers. For the purpose of viewing movies, we define "near" to mean commencement of viewing within a minute of viewer request as well as the ability to pause and resume at any time. Rewind and fast-forward functions are not a requirement. NVOD presents an exciting business opportunity to service providers: at long last, they will be able to collect unbounded revenues for "hot" titles while keeping costs fixed.

With NVOD, the nature of the communication network affects the extent to which the resource expenditure can be independent of the number of viewers. To this end, we distinguish between two types of networks based on the nature of the underlying physical layer. While NVOD service can be provided over both types, different such schemes are better suited to one type or the other. The types are:

- *Point-to-point networks.* Here, information sent to a given client is "heard" only by it, i.e., it does not reach other clients. Switched data networks with point-to-point links are one example. Another example is the telephone network and the related digital subscriber loop technologies, such as ADSL. The latter provide high communication bandwidth to the home over telephone lines in support of Internet communication as well as services such as VOD. A salient characteristic of such networks is that the communication bandwidth required for sending information to multiple users, even if this information is identical, is proportional to the number of recipients. Efficient routing techniques such as multicast routing can mitigate the deficiency.

- *Broadcast networks.* Here, all transmissions are broadcast, and each client selectively records the information that is intended for it. The two most prominent examples of such networks are coaxial cable distribution networks (cable television) and satellite-based networks. Thus, the bandwidth required for the transmission of the same information to multiple recipients can be independent of the number of recipients. The down side of this approach is that the total available bandwidth is often lower than with point-to-point networks, since there is no spatial multiplexing.

NVOD systems may be divided into two distinct categories: *open-loop* systems and *closed-loop* systems. In open-loop systems there is no feedback from the viewing client to the server, so neither server transmissions nor routing on the network are affected by viewer actions (other than the possible effect on routing due to a viewer joining a multicast group). Open-loop schemes lend themselves most naturally to broadcast-based networks, and are uniquely suited to such networks that have only one-way communication. This is the common case in satellite-based information-dissemination networks. Closed-loop systems permit some feedback that allows the server to adjust to client requests throughout the viewing period. Our focus in this paper is on open-loop schemes, which are best suited for broadcast topologies.

Prior art

Consider an NVOD system that should provide a movie of length $L$ seconds in a manner that permits viewing to commence within $D$ seconds after viewer request. The straightforward approach for providing such a service at a fixed cost is to start a copy of the movie every $D$ seconds. Viewing would simply entail each client's choosing one of the streams. The aggregate transmission rate (in steady state) would be $L/D$ streams. This is independent of the number of viewers but could be prohibitively expensive. For example, a 100-minute movie with a viewing delay of up to 30 seconds would require 200 streams, each at the original video rate. We refer to this scheme as the *baseline scheme*. Over the past several years, much research has beento NVOD schemes that require far less bandwidth for the same quality of service.

*Closed-loop schemes*

In A. Dan, P. Shahabuddin, D. Sitaran and D. Towsley, "Channel allocation under batching and VCR control in Movie-On-Demand servers", Technical report, IBM Research, 1994., a closed loop system based on "batching" was proposed: the server collects viewing requests over a period of time which is bounded from above by the permissible viewing-commencement delay $D$, but ends earlier if a sufficient number of requests arrive. Once the period ends, a new video stream is launched. With this approach, bandwidth consumption is not independent of viewer requests, but the amortized (over viewers) bandwidth can be bounded from above. The potential advantage of this scheme over the Baseline scheme is that in certain situations, it offers shorter mean viewing-commencement delay at no additional cost.

The scheme of L. Golubchik, L. C.-S. Lui, and R. R. Muntz, "Reducing I/O Demand in Video-On-Demand Storage Servers", Proceedings of ACM SIGMETRICS, pp. 25-36, 1995. complements (fewer) streams of the Baseline scheme with ad hoc "private" streams. The latter present the movie at a speed that differs from the nominal one by several percents. (Such a difference goes unnoticed by the viewer.) Within a time period $D$ from a viewing request, a new viewer is issued a fast private stream until it catches up with an earlier "Baseline" stream, or a slow private stream until a later "Baseline" stream catches up with it. For example, playing a stream that is faster than the nominal by 5 percent for ten minutes permits the viewer to catch up with a Baseline stream that started 30 seconds earlier. Typically, only the first few minutes of a movie are stored in the non-standard speed format, so the storage overhead is small. On average, this scheme reduces the required bandwidth, but its stochastic behavior makes it difficult to offer guarantees and may intermittently stress the server as well as a broadcast network.

*Open-loop schemes*

Recently, several interesting *open-loop* schemes have been proposed. These schemes assume that every client has a substantial amount of available storage capacity, which can be used to temporarily store portions of the movie. In such schemes, the server's transmission schedule and the algorithm used by the client to decide whether or not to "record" any given transmitted block jointly ensure that every segment of the movie will be on the user's disk by its viewing time. We next describe several such schemes. For facility of exposition and because that is the only case addressed by some of the schemes, we assume a fixed video rate. We conveniently use "length" to mean both viewing time and amount of data, and the video rate as our unit of data rate.

De Bey H. C. De Bey, "Program transmission optimisation", United States Patent Number 5,421,031, Mar 1995. suggested to partition a movie into $N=L/D$ blocks of (fixed) length $D$, where $D$ is the permissible viewing-commencement delay. The server transmits block $m$, $1 \leq m \leq N$, once every $m$ time slots; the duration of a time slot equals $D$. The client policy is to receive and store all the transmitted blocks that have yet to be viewed. The server and client policies jointly ensure that every block is available to the client at or before its viewing time. The mean transmission bandwidth with this scheme for a movie of length $L$ and permissible viewing delay $D$ is $$\overline{R}_t = \sum_{m=1}^{N} \frac{1}{m} \approx \ln\left(\frac{L}{D}\right).$$

This is a dramatic improvement over the baseline scheme. However, this method imposes heavy requirements on the client hardware. Analysis shows that required storage is almost $0.5L$, and reception bandwidth reaches more than 12 times the video rate for $L/D=100$, whereas in the Baseline scheme it is equal to the video rate and no storage is required. Furthermore, peak transmission bandwidth is much higher Tailor-Made transmission schedules for efficient NVOD service

36 than the average transmission bandwidth. Finally, the direct coupling between the length of the movie, permissible viewing delay and the transmission policy prevents any trade-off between the consumption of various resources.

The *Pyramid* scheme S. Viswanathan and T. Imielinski, "Metropolitan area video-on-demand service using pyramid broadcasting", Multimedia Systems, vol. 4, pp. 197-208, 1996. entails partitioning the movie into segments such that each segment is $\alpha$ times longer than the preceding one. Every segment is then transmitted at the same data rate. (This, of course, means that a block belonging to a given segment is retransmitted at time intervals that increase geometrically with segment number.) At any given time, the client records data from at most two (consecutive) segments. The value of $\alpha$ is chosen according to the permissible delay and available transmission bandwidth, and to ensure that the client will always have the upcoming data available in its storage so as to prevent viewing glitches.

The *Permutation Pyramid* scheme C.C. Aggarwal, J.L. Wolf, and P.S. Yu, "A permutation-based pyramid broadcasting scheme for video-on-demand systems", IEEE Proceedings of the International Conference on Multimedia Computing and Systems, pp. 118-126, Jun 1996. is based on the Pyramid. It creates multiple copies of each segment, partitions each copy into fixed size blocks, and interleaves the different copies of the segment such that same-numbered blocks are equispaced in the interleaved stream. The resulting stream is then transmitted at a fixed per-channel data rate. The result is a shorter viewing-commencement delay as well as lower client-storage and reception-bandwidth for the same amount of transmission bandwidth.

The *Harmonic broadcasting* scheme L-S. Juhn and L-M. Tseng, "Harmonic broadcasting for video-on-demand service", IEEE Trans. Broadcasting, vol. 43, no. 3, pp. 268-271, Sep 1997. uses segments of exponentially increasing size. This is essentially the block placement scheme of De Bey, viewed from a channel division perspective.

The *Staircase* scheme L-S. Juhn and L-M. Tseng, "Staircase data broadcasting and receiving scheme for hot video service", IEEE Trans. Consumer Electronics, vol. 43, no. 4, pp. 1110-1117, Nov 1997. presents yet another variant of the same general idea. Here, $\beta$ channels, each with a transmission rate equal to the video rate, are used. The $i$th channel, $1 \leq i \leq \beta$, is partitioned into $2^i$ subchannels. Next, the movie is divided into $N=2^\beta-1$ equisized segments (this is equal to the total number of subchannels). The segments are then assigned to the channels, one segment per subchannel, in ascending order of segments and channels. Finally, the segments assigned to each channel are interleaved with fine granularity such that the starting points of consecutive segments are staggered by equal distances, and the result is transmitted at the fixed channel rate. Transmissions occur concurrently on all channels. The client monitors the channels and records information that will not arrive again prior to its viewing time. This scheme outperforms the previous ones, except for the transmission bandwidth in the absence of client-storage and recording-rate constraints. In the latter case, the Harmonic scheme requires a lower transmission rate.

A close look at the NVOD problem reveals a multi-dimensional design space. All previously proposed schemes are based on a systematic "model-based" approach, resulting in very limited design flexibility. Moreover, there is no direct relationship between the design parameters in these schemes and the dimensions of the design space, so it is difficult to "navigate" intelligently even within the artificially constrained space.

Like many of the previous schemes, this paper also addresses open-loop NVOD that exploits client storage. It begins by explicitly presenting the design space. Next, unlike the prior art in this framework, we employ a novel algorithmic approach to optimize the transmission scheme. In so doing, we can minimize transmission rate while satisfying constraints on the remaining dimensions. Our algorithms can also be used in iterative procedures aimed at minimizing a different parameter subject to constraints on the remaining ones and a given transmission rate. The remainder of the paper is organized as follows. In Section 2, we analyze the data path and present the design space. In Section 3, we present our algorithms. Section 4 offers a comparison with prior art, Section 5 briefly discusses implementation-related issues, and Section 6 offers concluding remarks.

2. The open-loop NVOD design space

The provision of open-loop NVOD server to storage-capable clients entails (preferably) fixed-rate transmission by the server over a distribution network. Every client then selects the portions of the transmitted material that are relevant to it. A client "records" the selected material and plays it to the viewer at the right time. An NVOD solution thus comprises a transmission scheme which is executed by the server, and a corresponding selection algorithm which is executed by each client.

The server's task entails reading data from disk and transmitting itothe distribution network. As will be seen later, the required transmission rate for a single NVOD movie poses no problem to a high-performance disk drive and any PC. Moreover, in view of the inherently large ratio of clients to NVOD movies, the cost of a server is critical. Therefore, we do not directly associate cost or performance attributes with server resources.

The distribution network is clearly a critical resource, as its bandwidth is an expensive, possibly scarce, resource. We note in passing that this bandwidth is often quantized so it may be important to adhere to specific constraints. Thus, transmission bandwidth $R_t$ is an important dimension of the design space.

The demands placed on the user-premise equipment ("client") are of utmost importance. If it is dedicated to the NVOD service, cost–reduction is critical due to the large quantities. If it is embodied in existing equipment, e.g., a personal computer, then the resource requirements of the NVOD service will determine the fraction of viewers to which the service can be offered.

Aside from decompression, which depends solely on the movie parameters, the main task performed by the client is recording selected incoming data and subsequently reading it out. If the temporary storage is provided by a disk drive, as is likely to be the case for some time, then disk bandwidth and the required storage capacity are the critical client resources. If the storage medium is semiconductor memory, then bandwidth is negligible and only capacity matters. So, we define the peak client recording rate, $R_r$, and the peak client storage requirement, $S_{max}$, as two more dimensions. It should be pointed out that once actual viewing begins, the client records data to disk while reading back data for playback, the latter occurring at an essentially fixed rate. Thus, the maximum permissible recording rate is equal to the disk's effective rate minus the video rate.

Even if a disk drive is used as the client's primary medium for temporary storage, it is possible to use the client's memory in several ways in order to mitigate the recording-bandwidth requirements. One could therefore include the available amount of client memory as another design parameter. This use of memory, however, is closely related to a variety of implementation issues and is not addressed in any depth by the previously proposed schemes. In order to facilitate comparison and to focus on the main contributions of this paper, we do not discuss this use of memory in any detail.

3. The Tailor-Made NVOD scheme

Let us divide a given movie into $L$ (small) segments, and use $m$ (for "movie") to denote the segment number. Next, let us refer to the client's time axis, whose origin is at the time that the client begins to receive and record the movie. We denote time on this axis by $v$ (for "viewer"), and use $v(m)$ to denote the time (on the client's time axis) at which the viewer begins to view segment $m$. For facility of exposition, the movie segments will all be of equal sizes and duration, thus implicitly assuming a fixed video rate. Also, the duration of the viewing of a single segment will be taken as the unit of time, the size of a segment will serve as the unit of storage, and the movie's data rate will be used as the unit of bandwidth. Thus, the viewer views movie segment $m$ at time $v(m)=D+m$, where $D$ denotes the permissible viewing-commencement delay. We initially assume that the viewer does not pause, but this will be relaxed. Finally, we note that the Tailor-Made algorithms that will be presented shortly can and have been adapted to the case of variable video rate and segment sizes.

*Client action.* The client's task, as in all NVOD schemes, is to decide which arriving information it should record and which should be discarded. In our case, the client is aware of the transmission schedule, and records arriving information if and only if it is not scheduled to arrive again prior to the earliest time at which it may be needed for viewing.

*Server action.* The Tailor-Made scheme assigns a transmission rate $r_t(m)$ to the $m$th segment, and all segments are transmitted concurrently and repetitively by the server without any synchronization among their starting times. (In practice, blocks belonging to the various segments can be time-interleaved on one or several channels.) Thus, the server transmits at a fixed data rate $R_t = \Sigma r_t(m)$, regardless of whether the video rate of the movie is fixed or variable. The algorithms that will be described shortly produce the values of $r_t(m)$ that minimize $R_t$ while satisfying various client-related requirements and constraints.

*Lemma 1:* In any feasible open-loop NVOD transmission scheme, $r_t(m) > (1/v(m))$.

*Proof:* By contradiction. The amount of segment-$m$ data that is transmitted during $v(m)$ seconds is $r_t(m) \cdot v(m)$. Thus, if $r_t(m) < (1/v(m))$, only part of the segment will be recorded in time for its viewing.

*Proposition 2:* For any open-loop storage-assisted VOD system, the minimum aggregate transmission bandwidth $R_t$ (expressed in units of the movie's data rate) required to satisfy a viewing-commencement delay $D$ is $$R_t^{\min} = \ln\left(1 + \frac{L}{D}\right).$$

*Proof:* Follows from Lemma 1 by choosing the minimum values for $r_t(m)$, substituting $v(m) = D + m$, and approximating the summation over $m$ with integration.

With $R_t = R_t^{\min}$, a client must record all incoming data belonging to segments that have yet to be viewed. Unfortunately, this results in a very high recording rate at the beginning, and the peak client-storage requirement is a large fraction of the movie. In order to reduce peak client recording rate and/or the required amount of client storage space, one must increase server transmission rate. Our algorithms will start out from the minimum-rate solution and will strive to minimize the additional transmission bandwidth required in order to satisfy constraints on the peak client recording rate $R_r$ and its peak storage requirement $S_{max}$. Before presenting the algorithms, we next derive several important relationships.

If a movie segment is allocated a higher transmission rate than the minimum, the client may postpone the time at which it begins to record this segment. With the unconstrained minimum-bandwidth solution, a client's recording rate decreases monotonically with viewing time, as segments that have been viewed are no longer being recorded. Therefore, postponing the commencement of recording certain segments can reduce the peak recording rate. Also, this monotonicity suggests that it is best for the client to start recording any given segment as late as possible and to record it continuously until its viewing time. Denoting the (viewing) time at which a client begins to record movie segment $m$ by $s(m)$, it follows that $$r_t(m) = \frac{1}{v(m) - s(m)} = \frac{1}{D + m - s(m)}.$$

The recording rate at viewing time $v$ is given by $$r_r(v) = \sum_{\substack{m:s(m)<v \\ v(m)>v}} r_t(m) = \sum_{\substack{m:s(m)<v \\ v(m)>v}} \frac{1}{v(m) - s(m)} = \sum_{\substack{m:s(m)<v \\ m>v-D}} \frac{1}{D + m - s(m)}.$$

The amount of required client storage at viewing time $v$ is simply the amount recorded until that time minus the amount of data belonging to movie segments that have already been played. Stated differently, it is the amount recorded until $v$ from movie segments that have yet to be viewed. Therefore, $$S(v) = \sum_{\substack{m:s(m)<v \\ v(m)>v}} r_t(m) \cdot (v - s(m)) = \sum_{\substack{m:s(m)<v \\ m>v-D}} \frac{v - s(m)}{D + m - s(m)}.$$

We are now ready to present the algorithms. Based on the relationships just established, we choose to

39 express the transmission-bandwidth allocation to a given segment $m$, $r(m)$, in terms of the viewing time at which a client would have to start recording this segment, $s(m)$. The various algorithms progress along the viewing time axis, starting at the time that the client begins to receive data. For facility of exposition, we ignore the fine details of indexing, e.g. beginning at $v=0$ or $v=1$. The function Update() recalculates all necessary values using the above formulas. The efficiency of execution of this function is important to the run-time of the algorithm but has no effect on the results. Since this is an off-line algorithm and to prevent loss of focus, we do not discuss its details.

Constrained client storage.

The storage requirement when viewing commences is zero, since no data has been recorded. Similarly, it is zero at the end of viewing, since no data has yet to be played. Thus, client storageconsuminitially increases with time, then peaks and falls off.

Our Tailor-Made algorithm "sweeps" through the viewing times from beginning to end. If the storage constraint is violated at viewing time $v$, we increment the transmission bandwidths of relevant segments (those whose recording begins prior to $v$ and which are still stored at time $v$) until it is satisfied. One key idea of the algorithm is to do so by incrementing $s(m)$; another is to always add the bandwidth to the latest relevant segment.

Tailor-Made transmission schedules for efficient NVOD service

*Algorithm 1.* Constrained client storage

```
1.     for all m, s(m)=0;      // unconstrained optimal assignment.
2.     Update();
3.     for (v=1; v<D+L; v++){ // sweeping across viewing times.
4.             m=L;
5.             while((S(v)>S_max) && (m>v-D)){  // sweeping across relevant segments from end to beginning.
6.                     while((S(v)>S_max) && (s(m)<v){  // iterating over s(m).
7.                             s(m)++; Update();  // adding bandwidth to the latest relevant segment.
8.                     }
9.                     m--;  // prepare to start shifting the starting time of the previous movie segment.
10.            }
11.    }
12.    for (m=1; m≤L; m++) { r_t(m)=1/(D+m-s(m))};
```

Remark. Since the algorithm can reach the solution of $s(m)=v(m)-1$ for all $m$, which requires no storage, successful completion is guaranteed. Therefore, we do not check for error conditions.

The following lemmas and theorem establish the optimality of Algorithm 1.

*Lemma 3:* For any movie segment $m$ and viewing time $v$, increasing $r_t(m)$ reduces $S(v)$ or leaves it unchanged.

*Proof:* For any given segment $m$, we obviously only need to consider changes in the storage required to store portions of it at any viewing time. Consider the increase in $s(m)$ from $s_1(m)$ to $s_2(m)$ corresponding to the increase in $r_t(m)$. For $v<s_1(m)$, there is obviously no change. For $s_1(m) \le v \le s_2(m)$, there is a drop to zero since $m$ has yet to be recorded. So, let us focus on $v>s_2(m)$.

Consider a viewing time $v$ such that $v>s_2(m)$. Since we increased $r_t(m)$ while leaving the time at which its recording ends unchanged, it follows that the amount of data from segment $m$ that is recorded in the time interval between $v$ and $v(m)=m+D$ increases. Since the size of $m$ is unchanged, it follows that the amount of segment-$m$ data recorded between $s_2(m)$ and $v$ decreases. Consequently, the amount of segment-$m$ data that is stored at time $v$ also decreases.

*Lemma 4:* Consider a client that records a given movie segment during a time interval of a given length. Then, the client's storage requirement is minimized by making this interval contiguous, ending at the viewing time of the given segment.

*Proof:* The client can only release the segment's data once it has been viewed. Therefore, recording a portion of the segment at an earlier time merely means that it must be stored for a longer time, thereby possibly increasing the client's storage requirement.

*Lemma 5:* At any viewing time $v$, the sensitivity of the required amount of client storage to an incremental increase in transmission bandwidth of a movie segment $m$ is highest if $m$ is the latest segment that is still relevant to $v$.

*Proof:* Segment $m$ is relevant to viewing time $v$ if an only if $s(m)<v$ and $D+m \ge v$. (The latter follows from Lemma 4 and the fact that $v(m)=D+m$. For such a segment, increasing $r_t(m)$ by a small amount $x$ causes an increase by $x \cdot (D+m-v)$ in the amount of segment-$m$ data that is recorded between time $v$ and the viewing time of $m$, namely $D+m$. Prior to the increase in $r_t(m)$, this data was recorded earlier than $v$ and therefore contributed to $S(v)$. It follows that increasing $r_t(m)$ by $x$ reduces $S(v)$ by $x \cdot (D+m-v)$. It is readily seen that this reduction increases linearly with $m$, regardless of $s(m)$.

*Lemma 6:* The effect of adding a given amount of transmission bandwidth to a given movie segment on the recording rates and required storage at any given viewing time is independent of the transmission rates of the other segments.

*Lemma 7:* Throughout the execution of Algorithm 1, $s(m)$ is monotonically non-decreasing in $m$.

*Proof:* By induction on iterations of the algorithm. Initially, $s(m)=0$ for all $m$. In each iteration, the starting time of the latest possible segment is delayed, so monotonicity is preserved.

*Lemma 8:* Consider an arbitrary iteration of Algorithm 1, a viewing time $v$, and a segment $m$ which is still relevant to $v$; i.e., $s(m)<v$ and $v(m)>v$. Next, define the relevance interval of $m$ to be the range of viewing times to which it is still relevant. Then, the relevance sub-interval of $m$ which begins at time $v$ contains similar such sub-intervals of all earlier movie segments.

*Proof:* The relevance sub-interval of segment $m$ which is still relevant to $v$ extends contiguously from $v$ to $v(m)=D+m$.

*Lemma 9:* Algorithm 1 does not waste transmission bandwidth. In other words, if $S(v)$ is reduced to equal $S_{max}$ when viewing time $v$ is addressed explicitly (the index of the outer loop equals $v$), and is subsequently reduced further when addressing $v'>v$, then there is no beneficial way to reclaim the spent bandwidth by revisiting $v$.

*Proof:* By contradiction. Consider $v'>v$ and a situation wherein, as the algorithm adds transmission bandwidth to some segment $m'$ in order to reduce $S(v')$, we discover that we are also reducing $S(v)$. Since incrementing $s(m')$ affects both $S(v')$ and $S(v)$, it follows that $v(m')>v'>v$ and $s(m')<v<v'$. Also, since Algorithm 1 addresses viewing times in ascending order and increases transmission bandwidth of relevant segments in descending segment order, it follows that $s(m)=v'$ for all $m>m'$. Finally, since $m'$ is still relevant to $v$, it follows that its potential contribution to the reduction of $S(v)$ was not exhausted when $v$ was addressed. Consequently, no earlier segments than $m'$ received additional bandwidth on behalf of $v$. In view of the above, any attempt to "reclaim" transmission bandwidth that was assigned to segments on behalf of $v$ (reflecting the fact that $S(v)$ is below $S_{max}$ and may thus be increased) would have to involve later segments than $m'$. However, these segments received additional bandwidth on behalf of $v'$, so the result will be an increase in $S(v')$ which would then have to be reduced by assigning additional transmission bandwidth to $m'$ or to even earlier segments. Based on Lemma 5, however, the net result would be an increase in $R_t$.

*Theorem 10:* Algorithm 1 minimizes the aggregate transmission bandwidth $R_t$ subject to an upper limit of $S_{max}$ on client storage.

*Proof:* Lemma 3 guarantees that the algorithm makes forward progress, and Lemma 9 further assures us that no backtracking is ever beneficial. The recording intervals are all contiguous and end at the viewing times of the respective segments, which is optimal per Lemma 4. The segment-order in which additional bandwidth is granted is optimal per Lemma 5 subject to the relevance constraint. According to Lemma 6, no other execution order of the algorithm would enable a reduction in the storage requirement at time $v$ by adding bandwidth to later segments, so there is no way around the relevance constraints. Moreover, it follows from Lemma 8 that the range of later-than-$v$ viewing times that are affected by adding bandwidth to the latest relevant (to $v$) segment contains the corresponding ranges of earlier relevant segments. Therefore, every step taken by the algorithm follows the steepest-descent path for all later-than-$v$ viewing times. Lemma 6 guarantees that there are no other order-related issues. Based on the above and on Lemma 5, Algorithm 1 follows a steepest-descent path for all viewing times in every step, subject to unavoidable constraints, and is thus optimal.

Constrained client recording rate

With the unconstrained minimization of transmission bandwidth, recording bandwidth decreases with time, since $s(m)=0$ for all $m$ and, as time passes, more and more segments are played and their recording is terminated. Our approach here is to sweep through the viewing times from beginning to end, "flattening" the recording rate and causing it to conform to the constraint. The algorithm used to do so is very similar to the case of constrained client storage. The only difference stems from the fact that increasing the transmission rate of a segment incthe rerates at the times to which it is still relevant and decreases it for times to which it is no longer relevant. Accordingly, if we increase $s(m)$ in order to reduce $r_r(v)$, there is no sense in increasing $s(m)$ incrementally. Instead, we must set $s(m)=v$.

Tailor-Made transmission schedules for efficient NVOD service

43

*Algorithm 2.* Constrained client recording rate

```
1.      for all m, s(m)=0;           // unconstrained optimal assignment.
2.      Update();
3.      for (v=1; v<D+L; v++){       // sweeping across viewing times.
4.          m=L;
5.          while((r_t(v)>R_r) && (m>v-D)){   // sweeping across relevant segments from end to beginning.
6.              s(m)=v; Update();    // delaying the starting time of the latest relevant segment.
7.              m--;                 // prepare to start shifting the starting time of the previous movie segment.
8.          }
9.      }
10.     for (m=1; m≤L; m++) { r_t(m)=1/(D+m-s(m))};
```

Remark. Since the algorithm can reach the solution of $s(m)=v(m)-1$ for all $m$, which requires a fixed recording bandwidth equal to the video rate, successful completion is guaranteed. Therefore, we do not check for error conditions.

*Lemma 11:* Given an arbitrary viewing time $v$ and a state of the algorithm in which $s(m)$ is monotonically non-decreasing in $m$. In order to reduce $r_r(v)$, it is necessary to set $s(m)=v$ for one of the relevant segments. Then, the ratio between the reduction in client recording rate $r_r(v)$ and the increase in transmission bandwidth that would permit $s(m)=v$ is maximized by choosing $m$ to be the latest segment that is still relevant to $v$.

*Proof:* Let $s(m)<v$ denote the time at which the recording of $m$ began prior to the change. The corresponding transmission rate for $m$ was $1/(D+m-s(m))$, and this is obviously also the reduction in recording rate at time $v$ due to the change. The new transmission rate for segment $m$ is $1/(D+m-v)$. The ratio of reduction in recording rate at time $v$ to increase in $r_t(t)$ is therefore $$\frac{|\Delta r_r(v)|}{\Delta r_t(m)} = \frac{\frac{1}{D+m-s(m)}}{\frac{1}{D+m-v} - \frac{1}{D+m-s(m)}} = \frac{D+m-v}{v-s(m)}.$$

The numerator increases with an increase in $m$, and the denominator is monotonically non-increasing in $m$, so the ratio increases with an increase in $m$.

Based on Lemma 10 and the fact that Algorithm 2 acts consistently with it, as well as additional insight, we conjecture that Algorithm 2 is also optimal. However, do not have a formal proof.

We next turn our attention to the case in which both client storage and its recording bandwidth are constrained.

Constrained client storage and recording rate

We offer two algorithms for this case. The simpler one is identical to the one for constrained recording rate, except for the stopping condition.

*Algorithm 3.* Constrained client recording rate and storage (coarse)

Same as Algorithm 2, except:

```
5.      while(((r_t(v)>R_r) || (S(v)>S_max)) && (m>v-D)){   // sweeping backwards across relevant segments
```

Algorithm 3 is correct, but is not optimal. This is because it uses the coarse stepping of $s(m)$ even if the problem is only with $S(v)$. A similar modification of Algorithm 1 appears better, but is incorrect. The problem may occur when the last condition to be satisfied for a given value of $v$ is the storage limitation. In this case, there is a possibility that the starting time of the last segment to be moved was deferred from some earlier value but not all the way to $v$. The change in this starting time actually increases the recording bandwidth for certain earlier-than-$v$ viewing times. These have already been handled by the algorithm, so if the recording rate at such a point is pushed beyond the limit, the erroneous situation may persist. In order to solve this problem, we revisit the vulnerable interval, checking the recording rate against the constraint and pushing the starting time of the segment as necessary. This is stated formally as follows.

*Algorithm 4.* Constrained client recording rate and storage (fine-grain)

```
1.      for all m, s(m)=0;      // unconstrained optimal assignment.
2.      Update();
3.      for (v=1; v<D+L; v++){  // sweeping across viewing times.
4.              m=L;
5.              while(((r_r(v)>R_r) || (S(v)>S_max)) && (m>v-D)){ // sweep backwards thru relevant segments.
6.                      while(((r_r(v)>R_r) || (S(v)>S_max)) && (s(m)<v){  // iterating over s(m).
7.                              s(m)++; Update(); //  adding bandwidth to the latest relevant segment.
8.                      }
9.                      if(s(m)<v){ // both constraints satisfies; storage was limiting; vulnerable interval
10.                             for(v'=s(m)+1; v'≤v; v'++){ // sweeping vulnerable interval for recording rate
11.                                     if(r_r(v')>R_r) s(m)=v';
12.                             }
13.                     m--; // prepare to start shifting the starting time of the previous movie segment.
14.             }
15.     }
16.     for (m=1; m≤L; m++) { r_t(m)=1/(D+m-s(m))};
```

Remark. If a vulnerable interval is detected and swept, it is guaranteed that both constraints are satisfied for the current $v$, so the algorithm will exit the loop of step 5 and move on to the next viewing time.

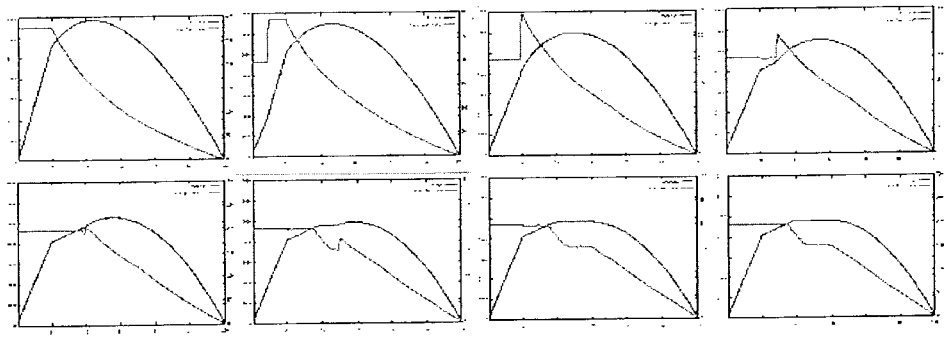

Fig. 1 Animation of the bandwidth-allocation algorithm that satisfies both recording-rate and client-storage constraints. Storage consumption (dome-shaped) and recording rate are plotted as a function of viewing time for snapshots of the algorithm as it sweeps forward across viewing time. The sudden rise in recording rate identifies the viewing time that is being addressed by the algorithm (the value of *v* in its outer loop).

Algorithm 4, like the previous ones, starts out with a complete transmission-bandwidth assignment, namely the minimal unconstrained assignment. As it progresses, it only increases bandwidth allocations. Therefore, while the algorithms sweeps through the range of viewing times, focusing on them one by one, any snapshot of algorithm's state will reveal a complete set of transmission-rate assignments to all movie segments. From these, $r_r(v)$ and $S(v)$ can be computed for the entire range of viewing time.

Figure 1 presents plots of $r_r(v)$ and $S(v)$ for such snapshots taken at different values of the viewing time that is being addressed (different iterations of the outermost loop of the algorithm). The pictures are presented in row-major order. In each picture, we show $r_r(v)$ and $S(v)$ versus $v$. The upper left picture depicts the unconstrained minimum transmission rate solution: $r_r(v)$ is fixed until $v=D$ since $s(m)=0$ for all $m$ and all segments are being recorded, and $S(v)$ increases linearly during this interval. As viewing begins, the recording of segments gradually comes to an end, with the highest-bandwidth (earliest) segments being dropped first. Storage consumption is the integral of recording rate minus the fixed viewing rate. It reaches a peak and then falls off gradually. In the next three snapshots, we see how the algorithm sweeps across viewing time, forcing recording rate down to the permissible upper limit. In so doing, recording rate for subsequent segments may actually increase, but storage never does. The sudden rise in the recording-rate plot reveals the viewing time that is being addressed by the algorithm. Moving from left to right in the bottom row, we enter a region in which storage becomes the limiting factor and recording rate falls below the permissible maximum. Subsequently, we enter a region in which both recording rate and storage consumption are below the upper limit and the algorithm may stop. There are situations in which only one of the constraints comes to bear, in which case only one of the regions is visible. In other cases, there may be a range of $v$ in which recording rate is no longer a problem and storage consumption is not yet a problem; in such a region, both $r_r(v)$ and $S(v)$ would be below the limit, as is always the case in the final range of $v$.

Support for pausing

Pausing and instantaneous resumption can be supported while satisfying the constraints and without any server involvement or increase in transmission rate. In the algorithm, it is assumed that every data block in client storage and every arriving block contains metadata that specifies the time until its next arrival. This can be done easily in several ways. For brevity's sake, we only sketch the client algorithm and offer a correctness proof.

*Algorithm 5.* Pause (*executed by the client!*)

```
1.    Upon receipt of Pause command: {
2.             freeze the viewing clock at the current value of v;
3.             while pausing {
4.                     continue receiving and recording data as if viewing at time v;
5.                     drop the "oldest" bits for each segments as new ones arrive (FIFO);
6.             }
7.    }
8.    release the vieclock and resume normal operation;
```

Remark. In practice, block-level interleaving may be used to transmit the various segments over a single channel. In such a case, a block will be recorded if and only if its next transmission is later than the time at which it would be needed for viewing if viewing were resumed immediately. Similarly, any given stored block is dropped if its next transmission will definitely occur before the earliest time at which it may be required for viewing.

*Theorem 12:* Algorithm 5 is correct. Moreover, the ability to pause at any time and resume viewing instantaneously requires no additional resources.

*Proof:* Consider a situation wherein viewing is paused at time $t_1$ with corresponding algorithm viewing time $v_1$, and resumed $\delta$ time units later. Next, consider the pausing viewer V1 and a second viewer V2 that begins viewing the movie $\delta$ time units after V1. Viewer V2 does not pause. Let us examine the storage contents of the two viewers at time $t_1+\delta$.

V1 received ("heard") all the blocks that V2 received since its viewing began, and discarded only those blocks that were guaranteed to be received again before their earliest possible viewing times. (At any given time, Algorithm 5 assumes that viewing may be resumed immediately.) Therefore, the storage content of V1 is a superset of V2's content at all times.

The non-pausing viewing algorithm is correct. Once viewing is resumed, V1 and V2 will continue receiving identical data and both will be executing identical algorithms with identical viewing times (starting at $v=v_1$ on the algorithm's viewing-time scale. This, combined with the previous observation, guarantees correctness of the Algorithm 5.

Next, suppose that at time $t_1+\delta$, the storage content of V1 a proper superset of V2's storage content, and consider data from segment $m>v_1+D$ that is present only in V1's storage. If this data is not transmitted again prior to its viewing time, V2 will have a problem, which contradicts the correctness of the uninterrupted-viewing algorithms. If it is transmitted again, Algorithm 5 (for V1) would have discarded it by time $t_1+\delta$, which contradicts the assumption. Therefore, the storage contents of V1 and V2 at time $t_1+\delta$ are identical. In conclusion, the storage contents of a client that paused at viewing time $v$ and has been pausing for a duration $\delta$ is identical to that of a client that began viewing $\delta$ time units later, does not pause, and is at viewing time $v$. This guarantees that the peak storage requirement for a pausing client is equal to that of a non-pausing client.

The proof for recording rate follows directly by recalling that the recording rate is the derivative with respect to time of the storage content. (In fact, the required disk data rate during pause is even lower because no data is read from disk and discarding merely entails manipulation of metadata.)

4. Results and comparison with prior art

The purpose of this section is twofold: to compare the new Tailor-Made scheme with previously proposed open-loop schemes, and to provide several representative designs.

The comparison with other schemes is complicated by the fact that their results usually do not explicitly refer to all the dimensions of the design space (aggregate transmission rate $R_t$, viewing-commencement latency $D$, peak client recording rate $R_r$, and peak client storage consumption $S_{max}$). Also, they cannot generate transmission schemes to specification. Therefore, we were forced to reconstruct several design points for each scheme and to then tailor our design to match these points in all but one dimension. The plots presented in papers describing the previously-proposed schemes depict the value of one parameter, e.g., $R_t$, versus that of another such as $D$. These plots are somewhat misleading, however, because the remaining parameters are not held constant. All this makes the presentation of comparative plots either meaningless or prohibitively effort-consuming. Instead, we resort to tables with a small number of representative results. The Pyramid scheme S. Viswanathan and T. Imielinski, "Metropolitan area video-on-demand service using pyramid broadcasting", Multimedia Systems, vol. 4, pp. 197-208, 1996. is dominated by the Permutation Pyramid C.C. Aggarwal, J.L. Wolf, and P.S. Yu, "A permutation-based pyramid broadcasting scheme for video-on-demand systems", IEEE Proceedings of the International Conference on Multimedia Computing and Systems, pp. 118-126, Jun 1996.. The Harmonic scheme L-S. Juhn and L-M. Tseng, "Harmonic broadcasting for video-on-demand service", IEEE Trans. Broadcasting, vol. 43, no. 3, pp. 268-271, Sep 1997. performs well in terms of $R_t$ in the unconstrained case, but even then it is inferior even in this regard to the Tailor-Made scheme. This is due to the coupling between segment length and viewing-commencement delay $D$. At its only design point for any given combination of $L$ and $D$, the Harmonic scheme requires a large amount of client storage, rendering it impractical in many situations. In view of this, Talor-Made will only be compared with the Permutation Pyramid and Staircase schemes.

Remark. In order to conform to the format of the results for the other schemes, we cite the total disk rate $R_d$ rather than its recording rate $R_r$. For Tailor-Made, we use $R_d=R_r+1$, reflecting the fact that we did not exploit the extra bandwidth that is available for recording while $v<D$.

Tailor-Made transmission schedules for efficient NVOD service

47

Tables 1 and 2 present transmission-rate comparisons between the Tailor-Made scheme and the Permutation Pyramid and Staircase schemes, respectively, for equal values of $D$, $R_r$ and $S_{max}$. Movie length is 120 minutes, and the comparison is carried out for three values of $D$: 10, 30 and 60 seconds. $S_{max}$ is expressed in percents of the movie, and both $R_t$ and $R_r$ are expressed in units of the movie's video rate $R_v$. The advantage of the Tailor-Made scheme is clearly evident. However, a hidden advantage which is often of equal or greater importance is the ability of the Tailor-Made scheme to produce a bandwidth allocation that matches the constraints. The reader should appreciate that carrying out a similar comparison between two of the other schemes would be extremely tedious if not impossible due to the absence of this feature. A similar problem would occur in practice whenever an NVOD service has to be "squeezed" into a set of constraints.

|  | $D$[sec] | $S_{max}$ [%] | $R_d[R_v]$ | $R_t[R_v]$ |
|---|---|---|---|---|
| Perm. Pyr. | 60 | 23.3 | 3.65 | 18.56 |
| Tailor-Made | 60 | 23.3 | 3.65 | 5.29 |
| Perm. Pyr. | 30 | 24.3 | 3.89 | 20.21 |
| Tailor-Made | 30 | 24.3 | 3.89 | 5.93 |
| Perm. Pyr. | 10 | 24.5 | 4.25 | 22.74 |
| Tailor-Made | 10 | 24.5 | 4.25 | 7.05 |

Table 1. Transmission-rate comparison: Permutation Pyramid Vs. Tailor-Made. L=120 min.

|  | $D$[sec] | $S_{max}$ [%] | $R_d[R_v]$ | $R_t[R_v]$ |
|---|---|---|---|---|
| Staircase | 60 | 24.8 | 2.63 | 7 |
| Tailor-Made | 60 | 24.8 | 2.63 | 6.14 |
| Staircase | 30 | 24.9 | 2.75 | 8 |
| Tailor-Made | 30 | 24.9 | 2.75 | 6.83 |
| Staircase | 10 | 25.0 | 2.83 | 10 |
| Tailor-Made | 10 | 25.0 | 2.83 | 8.18 |

Table 2. Transmission-rate comparison: Staircase Vs. Tailor-Made. L=120 min.

In Tables 3 and 4, we focus on a single design point of the Permutation Pyramid and Staircase schemes, respectively. We use Tailor-Made to tailor a design point that is constrained in all but one dimension to the same values as the point of the referenced scheme, and compare the values in the remaining dimension. It can readily be seen that Tailor-Made dominates the referenced schemes. (In the third row of Table 3, $D<1$sec was deemed impractical, hence the lower value of $R_t$.)

|  | $D$[sec] | $S_{max}$ [%] | $R_d$ [$R_v$] | $R_t$ [$R_v$] |
|---|---|---|---|---|
| Perm. Pyr. | 30 | 24.3 | 3.89 | 20.2 |
| Tailor-Made | 30 | 24.3 | 3.89 | 5.9 |
| Tailor-Made | 1 | 24.3 | 3.89 | 10.2 |
| Tailor-Made | 30 | 2.7 | 3.8 | 20.2 |
| Tailor-Made | 30 | 24.3 | 2.09 | 20.2 |

Table 3. Tailor-Made Vs. Permutation Pyramid. L=120 min.

|  | $D$ [sec] | $S_{max}$ [%] | $R_d$ [$R_v$] | $R_t$ [$R_v$] |
|---|---|---|---|---|
| Staircase | 30 | 24.9 | 2.75 | 8 |
| Tailor-Made | 30 | 24.9 | 2.75 | 6.8 |

Tailor-Made transmission schedules for efficient NVOD service

| | 48 | | | |
|---|---|---|---|---|
| Tailor-Made | 14 | 24.9 | 2.75 | 7.9 |
| Tailor-Made | 30 | 12.5 | 2.75 | 7.9 |
| Tailor-Made | 30 | 24.9 | 2.48 | 7.9 |

Table 4. Tailor-Made Vs. Staircase. *L=120 min.*

Next, we demonstrate the capabilities and performance of the Tailor-Made scheme by showing several possible configurations for two video rates: 1.2Mb/s (MPEG-1 streams) in Table 5, and 4.8Mb/s (PAL broadcast quality MPEG-2 streams) in Table 6. In choosing the configurations, we targeted two communication fabrics: 10Mb/s Ethernet and a 25-30Mb/s cable channel.

| $L$ [min] | $D$[sec] | $S_{max}$[MB] | $R_d$[KB/s] | $R_t$ [Mb/s] |
|---|---|---|---|---|
| 30 | 10 | 32 | 766 | 8.43 |
| 30 | 30 | 32 | 596 | 7.13 |
| 120 | 10 | 265 | 412 | 10 |
| 120 | 30 | 162 | 412 | 9 |
| 120 | 30 | 64 | 710 | 13 |
| 120 | 30 | 32 | 596 | 22.35 |
| 120 | 30 | 12 | 650 | 27 |

Table 5. Tailor-Made design points for $R_v$=1.2Mbit/s (MPEG-1).

Tailor-Made transmission schedules for efficient NVOD service

49

| $L$ [min] | $D$[sec] | $S_{max}$ [MB] | $R_d$ [KB/s] | $R_t$ [Mb/s] |
|---|---|---|---|---|
| 120 | 30 | 1,600 | 3,900 | 26.4 |
| 120 | 60 | ,600 | 3,480 | 23.1 |
| 1 | 60 | 1,000 | 2,190 | 25.4 |

Table 6. Tailor-Made design points for $R_v$= 4.8Mbit/s (PAL broadcast-quality MPEG-2).

Referring to the bottom row of Table 5, for example, we see that even with only 12MB of client storage space, one can use a single 6MHz television channel (used with a cable modem) to offer a 120-minute MPEG-1 movie in NVOD mode with $D=30s$. This does not require a disk drive! Referring to the 5th row, two such movies can be offered concurrently if the client has 64MB of available memory, which will be very reasonable in the near future. Referring to the 4th row, 162MB of client storage would permit the provision of three such movies on a cable channel or one over 10Mb/s Ethernet. Tiny magnetic disk drives weighing only 20gr with double this capacity are becoming available. With 1.6GB of client storage, a single MPEG-2 movie with quality similar to broadcast-quality PAL can be offered over a cable channel. Recently, "digital TV" sets with multi-GB disk drives have been announced, so this configuration is also likely to become viable in the near future. Of course, the use of a modern PC as the platform for the client is likely to provide the required resources free of charge. We note in conclusion that the foregoing discussion also illustrated the importance of the ability to design the NVOD system to specifications.

Remark. The results in every row of the tables can be scaled in order to obtain numerous design points. To do so, $R_t$, $R_r$, $R_v$, and $S_{max}$ must be changed by the same multiplicative factor while keeping $D$ and $L$ unchanged.

Finally, it should be noted that the results presented in this section for the Tailor-Made scheme are conservative. No use was made of RAM buffers to mitigate the disk-rate requirement, and we even did not take advantage of the fact that as long as $v<D$, no data is read from disk so its entire bandwidth can be devoted to recording. Therefore, the advantage of Tailor-Made over the other schemes is actually greater than suggested by the results..

5. Implementation

Algorithm 4 has been coded and was in fact used to generate the Tailor-Made results presented in Section 4. Additionally, an algorithm that translates the bandwidth allocations into block-interleaved transmission schedules has been coded, and the translation results in a negligible increase in aggregate transmission rate.

An NVOD system prototype based on the Tailor-Made scheme is nearing completion in the Parallel Systems Laboratory at the Technion. Both client and server are running Windows NT. The implementation incorporates a variety of optimizations aimed especially at further reducing recording rate during the initial portions of viewing time. Therefore, the actual system should consume fewer resources than called for by the algorithm. Communication will use UDP, initially over 10Mb/s and 100Mb/s Ethernets, and subsequently over a variety of communication fabrics.

Once the basic system is running, attention will be shifted to issues such as efficient error-correction schemes as well as further optimizations.

6. Conclusions

This paper presented the Tailor-Made scheme for designing optimal open-loop NVOD systems that utilize client storage. Unlike all previous work, which followed an approach of a structured bandwidth allocation with some parameterization, Tailor-Made is algorithmic. It directly addresses constraints on resource utilization, and minimizes transmission bandwidth subject to those. Of course, one can use the algorithms as an oracle in an iterative search aimed at minimizing any one of storage consumption, recording rate and viewing-commencement delay subject to constraints on transmission rate and the other resources. In the paper, we presented algorithms for the case of a fixed video rate. However, the algorithms have been adapted and work equally well with variable data rates. It is important to observe that, regardless of the behavior of the video rate, the server always transmits at a fixed data rate.

The Tailor-Made transmission schemes are much more efficient than the prior art. In producing the Tailor-Made results for comparison with prior art, we refrained from any special optimizations such as taking into account the fact that the disk does not need to supply data until actual viewing begins. The actual advantage of our scheme is thus even greater than suggested by the comparison. Also, its ability to tailor the transmission schedule to the exact constraints makes the Tailor-Made approach particularly attractive due to quantization problems associated with many resources. For example, there is little meaning to being able to fit one and a half movies into a given cable-TV channel. Optimality of the Tailor-Made algorithms was formally claimed only for storage-constrained cases. However, we conjecture that the other algorithms are also optimal.

The Tailor-Made approach is practical. Our prototype, albeit still not fully operational, already demonstrates that the approach can be reduced to practice efficiently. Both the NVOD server and the client can be off-the-shelf PCs or workstations with a single disk drive and no special performance requirements. The client can also be embodied in a set-top box with a tiny, inexpensive disk drive or even with a reasonable amount of DRAM. Topics of ongoing research include, among others, utilization of RAM buffers to reduce the required disk bandwidth and efficient error-correction schemes that take disk performance into account.

References

[1] A. Dan, P. Shahabuddin, D. Sitaran and D. Towsley, "Channel allocation under batching and VCR control in Movie-On-Demand servers", Technical report, IBM Research, 1994.

[2] L. Golubchik, L. C.-S. Lui, and R. R. Muntz, "Reducing I/O Demand in Video-On-Demand Storage Servers", Proceedings of ACM SIGMETRICS, pp. 25-36, 1995.

[3] H. C. De Bey, "Program transmission optimisation", United States Patent Number 5,421,031, Mar 1995.

[4] S. Viswanathan and T. Imielinski, "Metropolitan area video-on-demand service using pyramid broadcasting", Multimedia Systems, vol. 4, pp. 197-208, 1996.

[5] C.C. Aggarwal, J.L. Wolf, and P.S. Yu, "A permutation-based pyramid broadcasting scheme for video-on-demand systems", IEEE Proceedings of the International Conference on Multimedia Computing and Systems, pp. 118-126, Jun 1996.

[6] L-S. Juhn and L-M. Tseng, "Harmonic broadcasting for video-on-demand service", IEEE Trans. Broadcasting, vol. 43, no. 3, pp. 268-271, Sep 1997.

[7] L-S. Juhn and L-M. Tseng, "Staircase data broadcasting and receiving scheme for hot video service", IEEE Trans. Consumer Electronics, vol. 43, no. 4, pp. 1110-1117, Nov 1997.

What is claimed is:

1. In a system wherein a server transmits a program having a certain duration, the program being received by a client, a method for scheduling the transmission of the program, comprising the steps of:
   (a) partitioning the program into a plurality of sequential segments, wherein each of said segment is equally divided into the same size;
   (b) selecting a transmission rate for each of said segments, said transmission rate that is selected for a preceding segment of said segments being faster than said transmission rate that is selected for a subsequent segment of said segments; and
   (c) transmitting said segments, by the server to said client, each said segment being transmitted at said corresponding transmission rate of said each segment during a session between said server and said client; at least some of said segments being transmitted at least partly simultaneously, and at least one of said segments being transmitted repeatedly during the duration of the program.

2. The method of claim 1, further comprising the step of:
   (d) recording said segments, by the at least one client;
and wherein, for each said segment subsequent to said first segment in the program, said transmission rate of said each segment is such that the at least one client begins to record said each segment at least as late as when the at least one client begins to record said segments that precede said segment in the program.

3. The method of claim further comprising the steps of:
   (d) recording said segments, by the at least one client; and
   (e) displaying said segments, by the at least one client;
and wherein, for each said segment subsequent to said first segment in the program, said transmission rate of said each segment is such that the at least one client must begin to record said each segment at least as late as when the at least one client must begin to record said segments that precede said segment in the program to ensure that said segments are displayed by the at least one client in said sequence.

4. The method of claim 1, wherein said partitioning of the program is effected by the server.

5. The method of claim 1, wherein said selecting of said transmission rates is effected by the server.

6. The method of claim 1, wherein said segments are of equal length.

7. The method of claim 1, further comprising the steps of:
   (d) recording said segments, by the at least one client; and
   (e) playing said recorded segments in said sequence, by the at least one client.

8. The method of claim 7, wherein the at least one client records only one copy of each said segment.

9. The method of claim 8, wherein said only one copy of said each segment is a last said copy received in an entirety thereof by the at least one client prior to said playing of said each segment.

10. The method of claim 1, wherein said selecting of said transmission rates is effected in a manner that minimizes a total bandwidth of said transmitting.

11. The method of claim 10, wherein said minimization of said total bandwidth is effected subject to a constraint based on at least one parameter of the at least one client.

12. The method of claim 11, further comprising the steps of:
   (d) recording said segments, by the at least one client, in a recording medium having a certain capacity;
   (e) playing said recorded segments in said sequence, by the at least one client; and
   (f) for at least one said recorded segment, deleting said recorded segment subsequent to said playing thereof, by the at least one client;
and wherein said at least one parameter includes said capacity of said recording medium, said constraint being that, at any one time, said recorded segments occupy at most said capacity of said recording medium.

13. The method of claim 12, wherein each said recorded segment is deleted immediately subsequent to said playing thereof.

14. The method of claim 11, further comprising the step of:
   (d) recording each said segment, by the at least one client, at at most a certain recording rate;
and wherein said at least one parameter includes said recording rate, said constraint being that a sum of said transmission rates of each said segment that is recorded by the at least one client at any one time is at most said recording rate.

15. The method of claim 11, further comprising the steps of:
   (d) recording each said segment, by the at least one client, at at most a certain recording rate, in a recording medium having a certain capacity;
   (e) playing said recorded segments in said sequence, by the at least one client; and
   (f) for at least one said recorded segment, deleting said recorded segment subsequent to said playing thereof, by the at least one client;
and wherein said at least one parameter includes said recording rate and said capacity of said recording medium, said constraint being that, at any one time:
   (i) said recorded segments occupy at most said capacity of said recording medium; and
   (ii) a sum of said transmission rates of each said segment that is recorded by the at least one client at said one time is at most said recording rate.

16. The method of claim 15, wherein each said recorded segment is deleted immediately subsequent to said playing thereof.

17. The method of claim 1, further comprising the step of:
   (d) partitioning at least one said segment into a plurality of subsegments; said transmitting of said at least one segment being effected by transmitting each said subsegment at a subsegment transmission rate at least as great as said transmission rate of said at least one segment.

18. The method of claim 17, wherein said partitioning of said at least one segment is effected by the server.

19. The method of claim 17, further comprising the steps of:
   (e) deriving at least one redundant subsegment from said plurality of subsegments, said transmitting of said at least one segment being effected by transmitting both said plurality of subsegments and said at least one redundant subsegment; and
   (f) increasing said transmission rate of said at least one segment in accordance with a number of said at least one redundant subsegment that are derived.

20. The method of claim 1, further comprising the step of:
   (d) transmitting the program as a single unit, by the server; said transmitting of each said segment commencing subsequent to a time at which a portion of said single unit corresponding to said each segment is transmitted.

21. The method of claim 1, further comprising the step of:
(d) storing at least one coy of each said segment, by the server, prior to said transmitting.

22. The method of claim 1, further comprising the step of:
(d) transmitting at least one item of metadata, by the server.

23. The method of claim 22, wherein said at least one item of metadata is included in at least one of said segments.

24. The method of claim 23, wherein said at least one item includes a sequence number of said segment wherein said at least one item is included.

25. The method of claim 23, wherein a plurality of copies of said segment, wherein said at least one item is included, are transmitted, and wherein, in at least one said copy of said segment wherein said at least one item is included, said at least one item includes at least one temporal value related to a time interval between a transmission start time of said at least one copy of said segment wherein said at least one item is included and a transmission start time of an immediately succeeding copy of said segment wherein said at least one item is included.

26. The method of claim 23, further comprising the step of:
(d) partitioning said segment, wherein said at least one item is included, into a plurality of subsegments;
each said subsegment including at least one said item of said metadata.

27. The method of claim 26, wherein said partitioning is effected by the server.

28. The method of claim 26, wherein said at least one item includes a sequence number of said subsegment.

29. The method of claim 26, wherein a plurality of copies of said subsegments of said at least one segment are transmitted, and wherein, in at least one said copy of said at least one subsegment, said at least one item includes at least one temporal value related to a time interval between a transmission start time of said at least one copy of said each subsegment of said segment wherein said at least one item is included and a transmission start time of a succeeding copy of said each subsegment of said segment wherein said at least one item is included.

30. The method of claim 29, wherein said succeeding copy of said each subsegment of said at least one segment, wherein said at least one item is included, is an immediately succeeding copy of said each subsegment of said each segment.

31. The method of claim 26, wherein said at least one item includes a size of said each subsegment.

32. The method of claim 26, wherein said at least one item includes said transmission rate of said segment wherein said at least one item is included.

33. The method of claim 26, further comprising the step of:
(e) deriving at least one redundant subsegment from said plurality of subsegments;
and wherein said at least one item includes a total number of said subsegments that are transmitted during said transmitting of said segment wherein said at least one item is included.

34. The method of claim 1, further comprising the step of:
(d) encrypting said segments, by the server, prior to said transmitting thereof.

35. The method of claim 1, further comprising the step of:
(d) compressing each said segment, according to a progressive encoding scheme, by the server, prior to said transmitting thereof.

36. The method of claim 1, further comprising the step of:
(d) deriving, from at least one said segment, a plurality of subsegments such that any subset, of said plurality of subsegments, that includes a certain number of said subsegments less than a total number of said subsegments, suffices to reconstruct said at least one segment;
said plurality of subsegments then being transmitted in place of said at least one segment.

37. The method of claim 36, wherein said deriving is effected according to a code selected from the group consisting of Reed-Solomon codes and Tornado codes.

38. A system for transmitting a program to at least one viewer according to the method of claim 1, comprising:
(a) a software module including a plurality of instructions for effecting said partitioning and said selecting;
(b) a processor for executing said instructions;
(c) a server for effecting said transmitting; and
(c for each of the at least one viewer, a client for receiving said transmitted segments, recording said received segments and playing said recorded segments in said sequence.

39. The system of claim 38, wherein said instructions are for selecting said transmission rates in a manner that minimizes a total bandwidth of said transmitting.

40. The system of claim 38, wherein said instructions are for selecting said transmission rates in a manner that minimizes a total bandwidth of said transmitting subject to a constraint.

41. The system of claim 40, wherein said client includes:
(i) a recording medium, having a certain capacity, for recording said segments;
said constraint being that, at any one time, said recorded segments occupy at most said capacity of said recording medium.

42. The system of claim 40, wherein said client includes:
(i) a recording medium, for recording said segments at a certain recording rate;
said constraint being that, at any one time, a sum of said transmission rates of each said segment that is recorded by said client at said one time is at most said recording rate.

43. The system of claim 38, further comprising:
(e) a distribution network for broadcasting the program to said at least one client.

44. The system of claim 38, wherein said software module and said processor are included in said server.

45. The method of claim 1, further comprising the steps of:
(d) recording said segments, by one of the at least one client;
(e) initiating a display of said segments, by said one client;
(f) pausing said display, by said one client;
(g) resuming said display, by said one client, subsequent to said pausing; and
(h) during said pausing, continuing said recording of at least a portion of said segments, by said one client.

46. The method of claim 45, further comprising the step of:
(i) transmitting, by the server to said one client, metadata that include, for each said segment, a display commencement time;
wherein said pausing is effected immediately prior to said displaying of one of said segments; and wherein said recording is continued in accordance with a time of said displaying remaining fixed at said display commencement time of said one segment.

47. The method of claim 46, wherein said metadata include, for each said segment, a next transmission time, the method further comprising the step of:
  (j) discarding at least one said segment that will be transmitted and recorded again prior to respective said display commencement times relative to immediate said resuming.

48. In a system wherein a server transmits a program having a certain duration, the program being received by a client, a method for scheduling the transmission of the program, comprising the steps of:
  (a) partitioning the program into a plurality of sequential segments, wherein each of said segment is equally divided into the same size;
  (b) selecting a transmission rate for each of said segments, said transmission rate that is selected for a preceding segment of said segments being faster than said transmission rate that is selected for a subsequent segment of said segments;
  (c) transmitting said segments, by the server to said client, each said segment being transmitted at said corresponding transmission rate of said each segment during a session between said server and said client; and
  (d) recording each said segment, by the client, at at most a certain recording rate;
wherein said selecting of said transmission rates is effected in a manner that minimizes a total bandwidth of said transmitting subject to a constraint that a sum of said transmission rates of each said segment that is recorded by the client at any one time is at most said recording rate.

49. A system for transmitting a program to at least one viewer according to the method of claim 48, comprising:
  (a) a software module including a plurality of instructions for effecting said partitioning and said selecting;
  (b) a processor for executing said instructions;
  (c) a server for effecting said transmitting;
  (d) for each of the at least one viewer, a client for receiving said transmitted segments, recording said received segments and playing said recorded segments in said sequence, said client including a recording medium for recording said segments at said recording rate.

50. In a system wherein a server transmits a program having a certain duration, the program being received by a client, a method for scheduling the transmission of the program, comprising the steps of:
  (a) partitioning the program into a plurality of sequential segments, wherein each of said segment is equally divided into the same size;
  (b) selecting a transmission rate for each of said segments, said transmission rate that is selected for a preceding segment of said segments being faster than said transmission rate that is selected for a subsequent segment of said segments;
  (c) transmitting said segments, by the server to said client, each said segment being transmitted at said corresponding transmission rate of said each segment during a session between said server and said client;
  (d) recording each said segment, by the client, at at most a certain recording rate, in a recording medium having a certain capacity;
  (e) playing said recorded segments in said sequence, by the client; and
  (f) for at least one said recorded segment, deleting said recorded segment subsequent to said playing thereof, by the client;
wherein said selecting of said transmission rates is effected in a manner that minimizes a total bandwidth of said transmitting subject to a constraint that, at any one time:
  (i) said recorded segments occupy at most said capacity of said recording medium; and
  (ii) a sum of said transmission rates of each said segment that is recorded by the client at said one time is at most said recording rate.

51. A system for transmitting a program to at least one viewer according to the method of claim 50, comprising:
  (a) a software module including a plurality of instructions for effecting said partitioning and said selecting;
  (b) a processor for executing said instructions;
  (c) a server for effecting said transmitting; and
  (d) for each of the at least one viewer, a client for receiving said transmitted segments, recording said received segments and playing said recorded segments in said sequence, said client including said recording medium.

52. In a system wherein a server transmits a program having a certain duration, the program being received by a client, a method for scheduling the transmission of the program, comprising the steps of:
  (a) partitioning the program into a plurality of sequential segments, wherein each of said segment is equally divided into the same size;
  (b) selecting a transmission rate for each of said segments, said transmission rate that is selected for a preceding segment of said segments being faster than said transmission rate that is selected for a subsequent segment of said segments;
  (c) transmitting said segments, by the server to said client, each said segment being transmitted at said corresponding transmission rate of said each segment during a session between said server and said client;
  (d) partitioning at least one said segment into a plurality of subsegments, said transmitting of said at least one segment being effected by transmitting each said subsegment at a subsegment transmission rate at least as great as said transmission rate of said at least one segment;
  (e) deriving at least one redundant subsegment from said plurality of subsegments, said transmitting of said at least one segment being effected by transmitting both said plurality of subsegments and said at least one redundant subsegment; and
  (f) increasing said transmission rate of said at least one segment in accordance with a number of said at least one redundant subsegment that are derived.

53. A system for transmitting a program to at least one viewer according to the method of claim 52, comprising:
  (a) a software module including a plurality of instructions for effecting said partitioning and said selecting;
  (b) a processor for executing said instructions;
  (c) a server for effecting said transmitting; and
  (d) for each of the at least one viewer, a client for receiving said transmitted segments, recording said received segments and playing said recorded segments in said sequence.

54. In a system wherein a server transmits a program having a certain duration, the program being received by a client, a method for scheduling the transmission of the program, comprising the steps of:
  (a) partitioning the program into a plurality of sequential segments, wherein each of said segment is equally divided into the same size;

(b) selecting a transmission rate for each of said segments, said transmission rate that is selected for a preceding segment of said segments being faster than said transmission rate that is selected for a subsequent segment of said segments; and (c) transmitting said segments, by the server to said client, each said segment being transmitted at said corresponding transmission rate of said each segment during a session between said server and said client; wherein said at least one item of metadata is included in at least one of said segments;

wherein a plurality of copies of said segment, wherein said at least one item of metadata is included, are transmitted; and wherein, in at least one said copy of said segment wherein said at least one item of metadata is included, said at least one item of metadata includes at least one temporal value related to a time interval between a transmission start time of said at least one copy of said segment wherein said at least one item of metadata is included and a transmission start time of an immediately succeeding copy of said segment wherein said at least one item of metadata is included.

55. A system for transmitting a program to at least one viewer according to the method of claim 54, comprising:

(a) a software module including a plurality of instructions for effecting said partitioning and said selecting;

(b) a processor for executing said instructions;

(c) a server for effecting said transmitting; and (d) for each of the at least one viewer, a client for receiving said transmitted segments, recording said received segments and playing said recorded segments in said sequence.

56. In a system wherein a server transmits a program having a certain duration, the program being received by a client, a method for scheduling the transmission of the program, comprising the steps of:

(a) partitioning the program into a plurality of sequential segments, wherein each of said segment is equally divided into the same size;

(b) selecting a transmission rate for each of said segments, said transmission rate that is selected for a preceding said segments being faster than said transmission rate that is selected for a subsequent said segments;

(c) including at least one item of metadata in at least one of said segments;

(d) partitioning said at least one segment, wherein said at least one item of metadata is included, into a plurality of subsegments, each said subsegment including at least one said item of metadata; and (e) transmitting said segments, by the server to said client, each said segment being transmitted at said corresponding transmission rate of said each segment during a session between said server and said client;

wherein a plurality of copies of said subsegments of said at least one segment are transmitted; and wherein, in at least one said copy of said at least one subsegment, said at least one item of metadata includes at least one temporal value related to a time interval between a transmission start time of said at least one copy of said each subsegment of said segment wherein said at least one item of metadata is included and a transmission start time of a succeeding copy of said each subsegment of said segment wherein said at least one item of metadata is included.

57. A system for transmitting a program to at least one viewer according to the method of claim 56, comprising:

(a) a software module including a plurality of instructions for effecting said partitioning and said selecting;

(b) a processor for executing said instructions;

(c) a server for effecting said transmitting; and (d) for each of the at least one viewer, a client for receiving said transmitted segments, recording said received segments and playing said recorded segments in said sequence.

58. In a system wherein a server transmits a program having a certain duration, the program being received by a client, a method for scheduling the transmission of the program, comprising the steps of:

(a) partitioning the program into a plurality of sequential segments, wherein each of said segment is equally divided into the same size;

(b) selecting a transmission rate for each of said segments, said transmission rate that is selected for a preceding segment of said segments being faster than said transmission rate that is selected for a subsequent segment of said segments;

(c) including at least one item of metadata in at least one of said segments;

(d) partitioning said at least one segment, wherein said at least one item of metadata is included, into a plurality of subsegments, each said subsegment including at least one said item of metadata; and (e) transmitting said segments, by the server to said client, each said segment being transmitted at said corresponding transmission rate of said each segment during a session between said server and said client;

and wherein said at least one item of metadata includes a size of said each subsegment.

59. A system for transmitting a program to at least one viewer according to the method of claim 58, comprising:

(a) a software module including a plurality of instructions for effecting said partitioning and said selecting;

(b) a processor for executing said instructions;

(c) a server for effecting said transmitting; and (d) for each of the at least one viewer, a client for receiving said transmitted segments, recording said received segments and playing said recorded segments in said sequence.

60. In a system wherein a server transmits a program having a certain duration, the program being received by a client, a method for scheduling the transmission of the program, comprising the steps of:

(a) partitioning the program into a plurality of sequential segments, wherein each of said segment is equally divided into the same size;

(b) selecting a transmission rate for each of said segments, said transmission rate that is selected for a preceding segment of said segments being faster than said transmission rate that is selected for a subsequent segment of said segments;

(c) including at least one item of metadata in at least one of said segments;

(d) partitioning said at least one segment, wherein said at least one item of metadata is included, into a plurality of subsegments, each said subsegment including at least one said item of metadata; and (e) transmitting said segments, by the server to said client, each said segment being transmitted at said corresponding transmission rate of said each segment during a session between said server and said client;

and wherein said at least one item of metadata includes a transmission rate of said segment wherein said at least one item of metadata is included.

61. A system for transmitting a program to at least one viewer according to the method of claim 60, comprising:
(a) a software module including a plurality of instructions for effecting said partitioning and said selecting;
(b) a processor for executing said instructions;
(c) a server for effecting said transmitting; and
(d) for each of the at least one viewer, a client for receiving said transmitted segments, recording said received segments and playing said recorded segments in said sequence.

62. In a system wherein a server transmits a program having a certain duration, the program being received by a client, a method for scheduling the transmission of the program, comprising the steps of:
(a) partitioning the program into a plurality of sequential segments, wherein each of said segment is equally divided into the same size;
(b) selecting a transmission rate for each of said segments, said transmission rate that is selected for a preceding segment of said segments being faster than said transmission rate that is selected for a subsequent segment of said segments;
(c) including at least one item of metadata in at least one of said segments;
(d) partitioning said at least one segment, wherein said at least one item of metadata is included, into a plurality of subsegments, each said subsegment including at least one said item of metadata;
(e) deriving at least one redundant subsegment from said plurality of subsegments; and
(f) transmitting said segments, by the server to said client, each said segment being transmitted at said corresponding transmission rate of said each segment during a session between said server and said client;
and wherein said at least one item of metadata includes a total number of said subsegments that are transmitted during said transmitting of said segment wherein said at least one item of metadata is included.

63. A system for transmitting a program to at least one viewer according to the method of claim 62, comprising:
(a) a software module including a plurality of instructions for effecting said partitioning and said selecting;
(b) a processor for executing said instructions;
(c) a server for effecting said transmitting; and
(d) for each of the at least one viewer, a client for receiving said transmitted segments, recording said received segments and playing said recorded segments in said sequence.

64. In a system wherein a server transmits a program having a certain duration, the program being received by a client, a method for scheduling the transmission of the program, comprising the steps of:
(a) partitioning the program into a plurality of sequential segments, wherein each of said segment is equally divided into the same size;
(b) selecting a transmission rate for each of said segments, said transmission rate that is selected for a preceding segment of said segments being faster than said transmission rate that is selected for a subsequent segment of said segments;
(c) transmitting said segments, by the server to said client, each said segment being transmitted at said corresponding transmission rate of said each segment during a session between said server and said client; and
(d) deriving, from at least one said segment, a plurality of subsegments such that any subset, of said plurality of subsegments, that includes a certain number of said subsegments less than a total number of said subsegments, suffices to reconstruct said at least one segment, said plurality of subsegments then being transmitted in place of said at least one segment.

65. A system for transmitting a program to at least one viewer according to the method of claim 64, comprising:
(a) a software module including a plurality of instructions for effecting said partitioning and said selecting;
(b) a processor for executing said instructions;
(c) a server for effecting said transmitting; and
(d) for each of the at least one viewer, a client for receiving said transmitted segments, recording said received segments and playing said recorded segments in said sequence.

66. In a system wherein a server transmits a program having a certain duration, the program being received by a client, a method for scheduling the transmission of the program, comprising the steps of:
(a) partitioning the program into a plurality of sequential segments, wherein each of said segment is equally divided into the same size;
(b) selecting a transmission rate for each of said segments, said transmission rate that is selected for a preceding segment of said segments being faster than said transmission rate that is selected for a subsequent segment of said segment;
(c) transmitting said segments, by the server to said client, each said segment being transmitted at said corresponding transmission rate of said each segment during a session between said server and said client;
(d) transmitting, by the server to said client, metadata that include, for each said segment, a display commencement time;
(e) recording said segments, by the said client;
(f) initiating a display of said segments, by the said client;
(g) pausing said display, by the said client;
(h) resuming said display, by the said client, subsequent to said pausing; and
(i) during said pausing, continuing said recording of at least a portion of said segments, by the said client;
wherein said pausing is effected immediately prior to said displaying of one of said segments; and wherein said recording is continued in accordance with a time of said displaying remaining fixed at said display commencement time of said one segment.

67. A system for transmitting a program to at least one viewer according to the method of claim 1, comprising:
(a) a software module including a plurality of instructions for effecting said partitioning and said selecting;
(b) a processor for executing said instructions;
(c) a server for effecting said transmitting; and
(d) for each of the at least one viewer, a client for receiving said transmitted segments, recording said received segments and playing said recorded segments in said sequence.

* * * * *

UNITED STATES PATENT AND TRADEMARK OFFICE
CERTIFICATE OF CORRECTION

PATENT NO. : 6,502,139 B1
DATED : December 31, 2002
INVENTOR(S) : Birk et al.

It is certified that error appears in the above-identified patent and that said Letters Patent is hereby corrected as shown below:

Column 53,
Line 29, the number "1" was omitted between "claim…….further"

Column 56,
Line 18, the line should begin with (d) and not (c)

Signed and Sealed this

Second Day of December, 2003

JAMES E. ROGAN
*Director of the United States Patent and Trademark Office*